United States Patent
Iyer et al.

(10) Patent No.: US 10,846,258 B2
(45) Date of Patent: Nov. 24, 2020

(54) VOLTAGE MODULATED CONTROL LANE

(71) Applicant: Intel Corporation, Santa Clara, CA (US)

(72) Inventors: Venkatraman Iyer, Round Rock, TX (US); Zuoguo Wu, San Jose, CA (US); Mahesh Wagh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 906 days.

(21) Appl. No.: 15/283,028

(22) Filed: Sep. 30, 2016

(65) Prior Publication Data

US 2018/0095925 A1    Apr. 5, 2018

(51) Int. Cl.
*G06F 13/42* (2006.01)
*G06F 1/3234* (2019.01)

(52) U.S. Cl.
CPC ........ *G06F 13/4265* (2013.01); *G06F 1/3253* (2013.01); *Y02D 10/14* (2018.01); *Y02D 10/151* (2018.01)

(58) Field of Classification Search
CPC ...... G06F 13/38; G06F 13/382; G06F 13/385; G06F 13/387; G06F 13/40; G06F 13/4004; G06F 13/4027; G06F 13/42
See application file for complete search history.

(56) References Cited

U.S. PATENT DOCUMENTS

| | | | |
|---|---|---|---|
| 9,361,257 B2 * | 6/2016 | Ziakas | G06F 13/385 |
| 9,425,903 B1 | 8/2016 | Nagarajan | |
| 9,946,676 B2 * | 4/2018 | Wagh | G06F 13/4022 |
| 10,073,808 B2 * | 9/2018 | Wu | G06F 13/4022 |
| 10,152,446 B2 * | 12/2018 | Iyer | G06F 13/4068 |
| 2010/0061497 A1 | 3/2010 | Buchmann et al. | |
| 2015/0003505 A1 | 1/2015 | Lusted et al. | |
| 2016/0072651 A1 | 3/2016 | Welch | |
| 2016/0285624 A1 * | 9/2016 | Wagh | H04B 3/46 |

FOREIGN PATENT DOCUMENTS

WO    2015099719 A1    7/2015

OTHER PUBLICATIONS

International Search Report and Written Opinion in International Application No. PCT/US2017/049343, dated Dec. 12, 2017, 13 pages.
International Preliminary Report on Patentability issued in International Application No. PCT/US2017/049343, dated Apr. 2, 2019; 12 pages.

* cited by examiner

*Primary Examiner* — Brian T Misiura
(74) *Attorney, Agent, or Firm* — Alliance IP, LLC

(57) ABSTRACT

A computing component is provided with physical layer logic to receive data on a physical link including a plurality of lanes, where the data is received from a particular component on one or more data lanes of the physical link. The physical layer is further to receive a stream signal on a particular one of the plurality of lanes of the physical link, where the stream signal is to identify a type of the data on the one or more data lanes, the type is one of a plurality of different types supported by the particular component, and the stream signal is encoded through voltage amplitude modulation on the particular lane.

16 Claims, 16 Drawing Sheets

VOLTAGE MODULATED CONTROL LANE

FIELD

This disclosure pertains to computing system, and in particular (but not exclusively) to point-to-point interconnects.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

Like reference numbers and designations in the various drawings indicate like elements.

DETAILED DESCRIPTION

Figure 1:
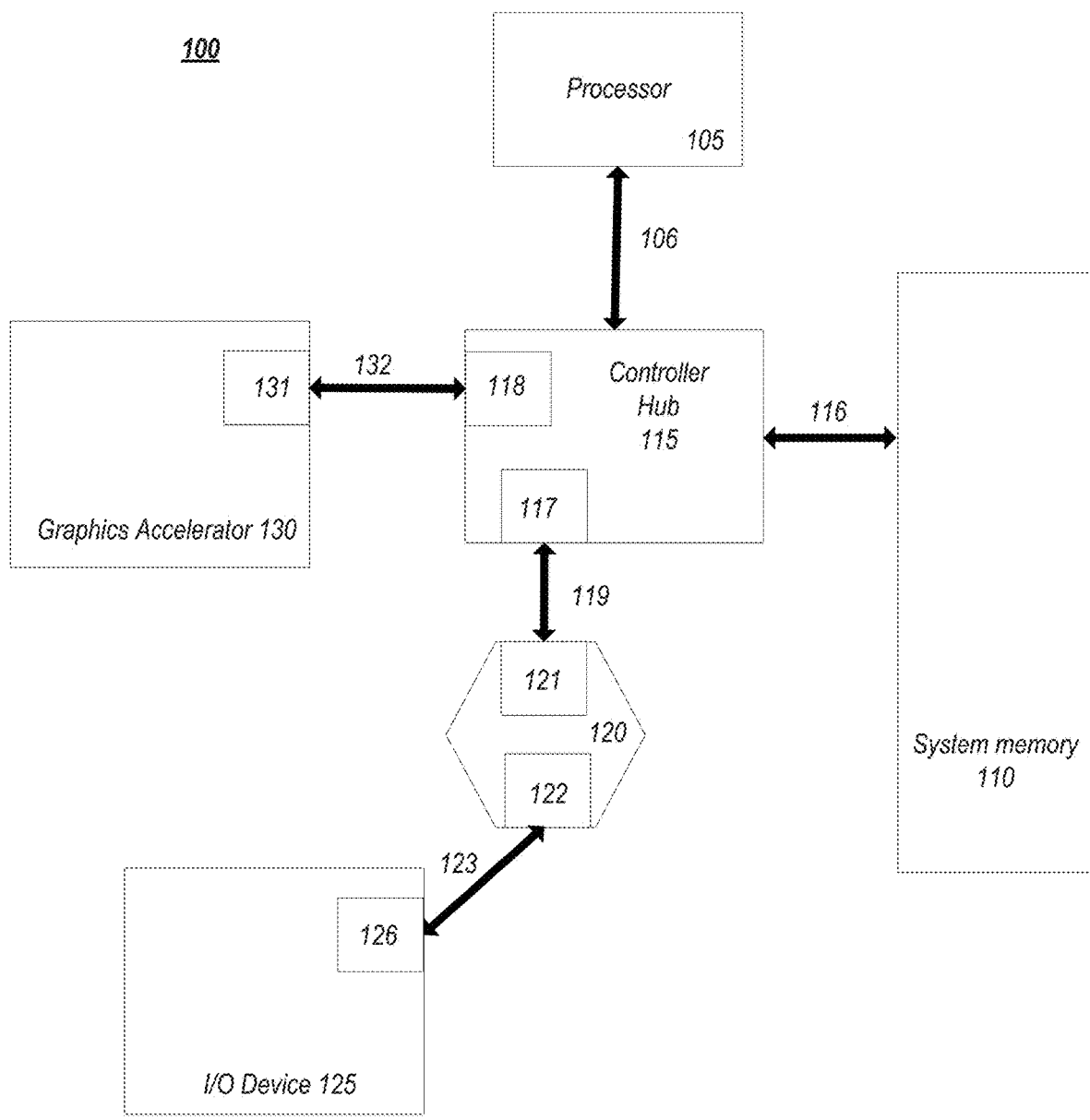
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
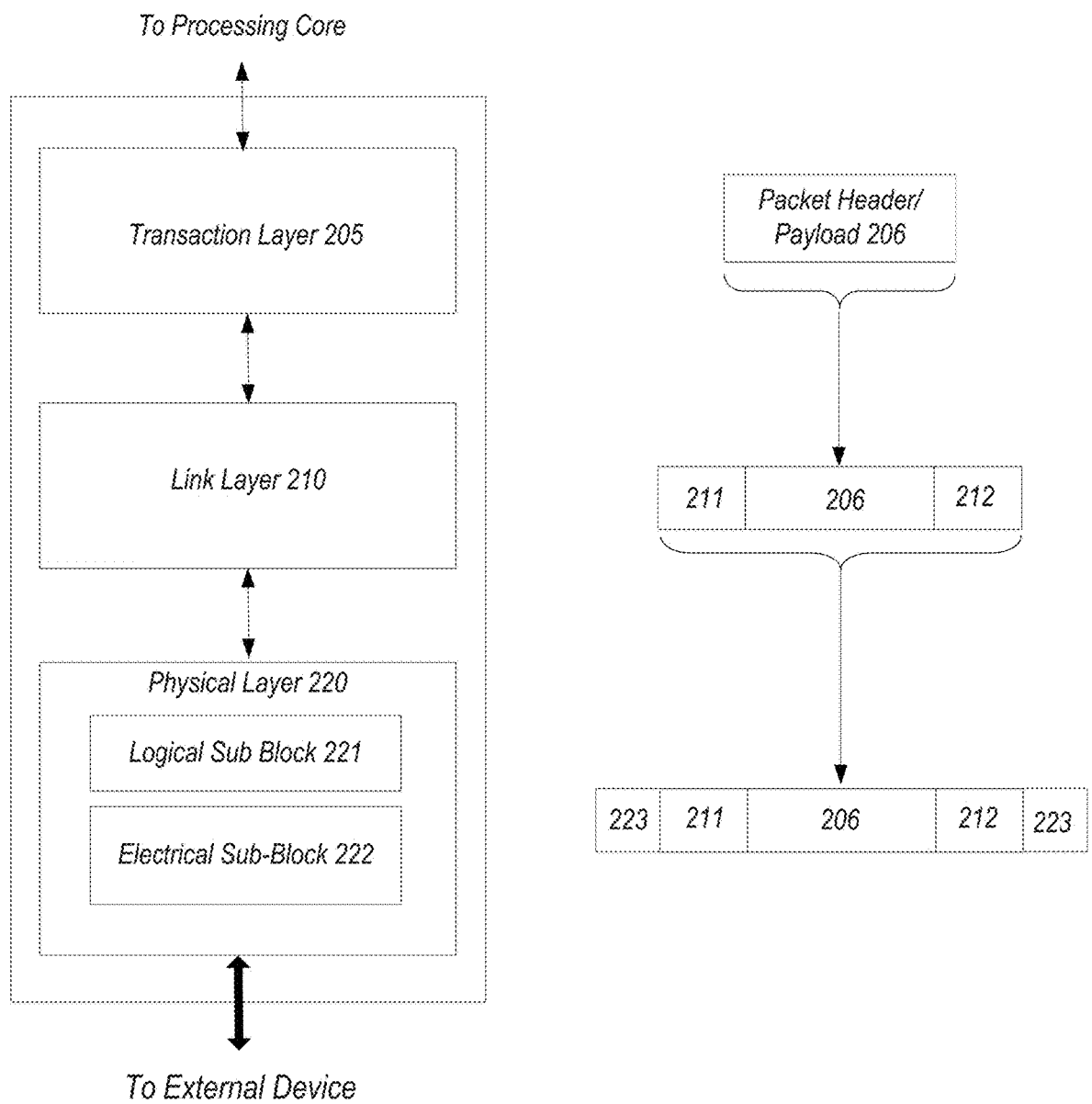
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCie stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
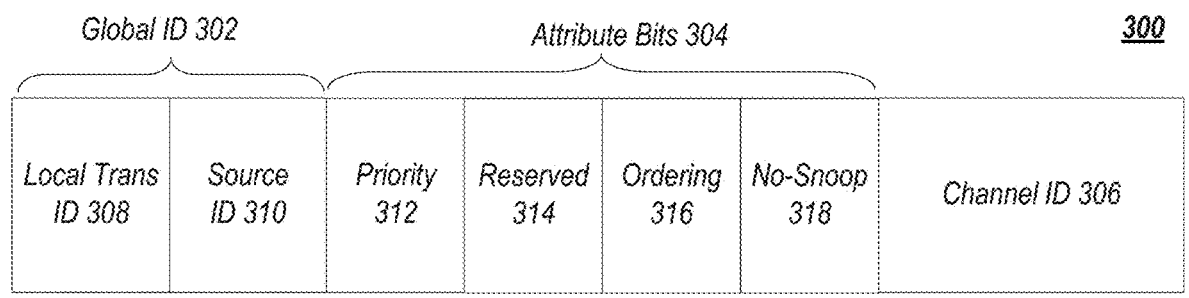
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes:

(1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
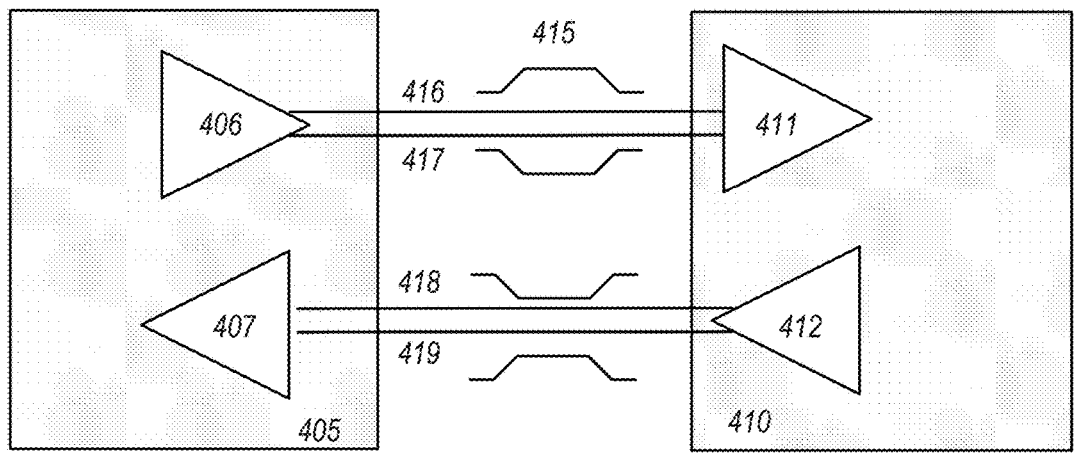
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by ×N, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figures 5A, 5B:
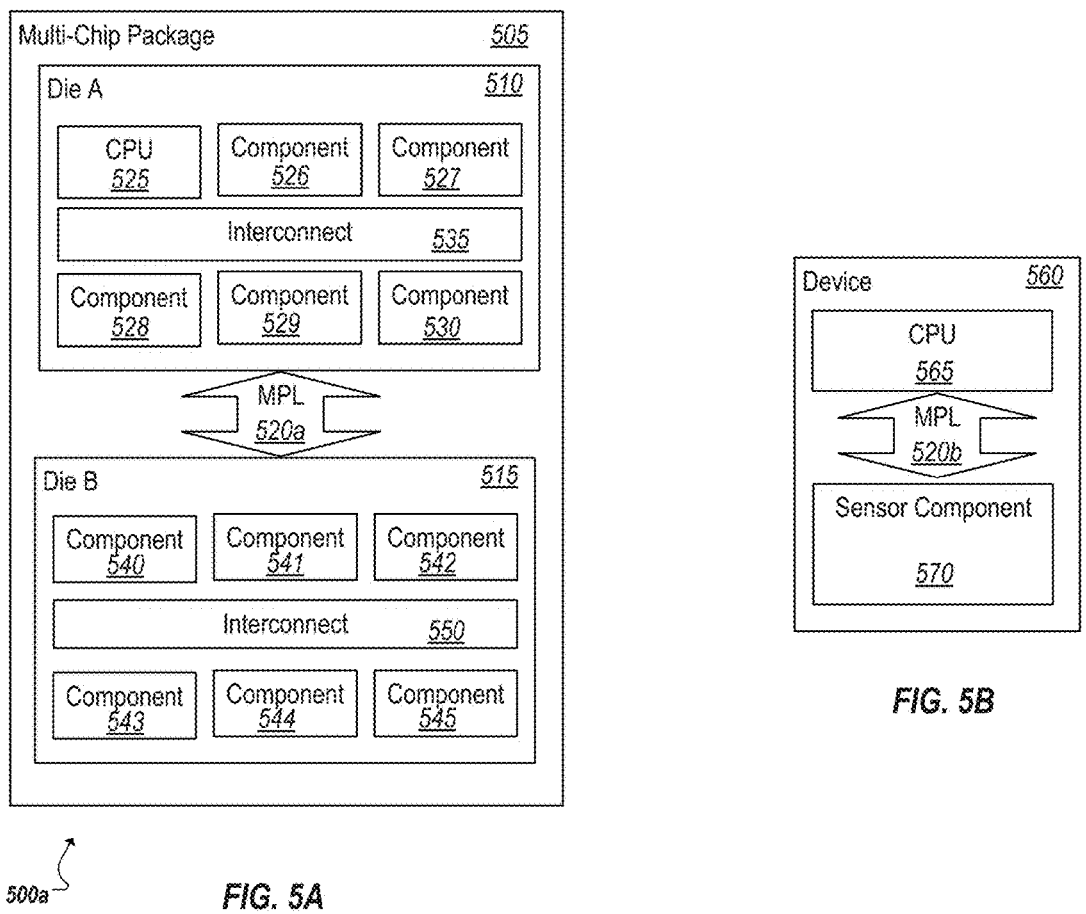
FIG. 5A illustrates an embodiment of a multichip package.
FIG. 5B illustrates use of a multiprotocol link (MPL).

FIGS. 5A-5B are simplified block diagrams 500a-b illustrating example systems implementing a link to enable signaling windows in which data of different protocols may be sent. In the example of FIG. 5A, an example multi-chip package 505 is represented that includes two or more chips, or dies, (e.g., 510, 515) communicatively connected using an example multi-protocol link (MPL) 520a. While FIG. 5A, illustrates an example of two (or more) dies that are interconnected using an example MPL 520a, it should be appreciated that the principles and features described herein regarding implementations of an MPL can be applied to any interconnect or link connecting a die (e.g., 510) and other components, including connecting two or more dies (e.g., 510, 515), connecting a die (or chip) to another component off-die, connecting a die to another device or die off-package (e.g., 505), connecting die to a BGA package, implementation of a Patch on Interposer (POINT), among potentially other examples.

Generally, a multichip package (e.g., 505) can be an electronic package where multiple integrated circuits (ICs), semiconductor dies or other discrete components (e.g., 510, 515) are packaged onto a unifying substrate (e.g., silicon or other semiconductor substrate), facilitating the combined components' use as a single component (e.g., as though a larger IC). In some instances, the larger components (e.g., dies 510, 515) can themselves be IC systems, such as systems on chip (SoC), multiprocessor chips, or other components that include multiple components (e.g., 525-530 and 540-545) on the device, for instance, on a single die (e.g., 510, 515). Multichip packages 505 can provide flexibility for building complex and varied systems from potentially multiple discrete components and systems. For instance, each of dies 510, 515 may be manufactured or otherwise provided by two different entities, with the silicon substrate of the package 505 provided by yet a third entity, among many other examples. Further, dies and other components within a multichip package 505 can themselves include interconnect or other communication fabrics (e.g., 535, 550) providing the infrastructure for communication between components (e.g., 525-530 and 540-545) within the device (e.g., 510, 515 respectively). The various components and interconnects (e.g., 535, 550) may potentially support or use multiple different protocols. Further, communication between dies (e.g., 510, 515) can potentially include transactions between the various components on the dies over multiple different protocols. Designing mechanisms to provide communication between chips (or dies) on a multichip package can be challenging, with traditional solutions employing highly specialized, expensive, and package-specific solutions based on the specific combinations of components (and desired transactions) sought to be interconnected.

The examples, systems, algorithms, apparatus, logic, and features described within this Specification can address at least some of the issues identified above, including potentially many others not explicitly mentioned herein. For instance, in some implementations, a high bandwidth, low power, low latency interface can be provided to connect a host device (e.g., a CPU) or other device to a companion chip that sits in the same package as the host. Such an multi-protocol link (MPL) can support multiple package options, multiple I/O protocols, as well as Reliability, Availability, and Serviceability (RAS) features. Further, the physical layer (PHY) can include an electrical layer and logic layer and can support longer channel lengths, including channel lengths up to, and in some cases exceeding, approximately 45 mm. In some implementations, an example MPL can operate at high data rates, including data rates exceeding 8-10 Gb/s.

While the example of FIG. 5A shows the employment of an MPL within a multi-chip package, which may include multiple feature rich components (with large shorelines to support multiple pins, which may be used to support multi-lane MPL links with potentially multiple data lanes and multiple control lanes), other implementations of an MPL may be employed in simpler devices with smaller or user-centered form factors, such as smartphones, internet of things (IoT) devices, etc. For instance, FIG. 5B illustrates an example implementation of a simplified system 560, which may include one or more processors (e.g., 565) and other components (e.g., a sensor component 570), which may be interconnected using a simplified version of an MPL link (e.g., 520b). Components (e.g., 565, 570) of the device 560 may have fewer functionality and smaller footprints than the on-die-systems 510, 515 of the multi-chip package 505 example of FIG. 5A. Accordingly, an example device 560 may support fewer pins, which may at the same time be suitable to simpler components (e.g., 565, 570), which may operate at relatively lower speeds, support fewer protocols, send smaller datagrams (at potentially lower speeds), and support fewer features, than more complex, high-speed components (e.g., 525-530, 540-545) of an example multi-chip packager 505. A simplified MPL link 520b may be provided, in some implementations, to offer the same multiprotocol functionality, but with lower pin count, such as discussed in the example bellow.

In one example implementation of an MPL, a PHY electrical layer can improve upon traditional multi-channel interconnect solutions (e.g., multi-channel DRAM I/O), extending the data rate and channel configuration, for instance, by a number of features including, as examples, regulated mid-rail termination, low power active crosstalk cancellation, circuit redundancy, per bit duty cycle correction and deskew, line coding, and transmitter equalization, among potentially other examples.

In one example implementation of an MPL, a PHY logical layer can be implemented that can further assist (e.g., electrical layer features) in extending the data rate and channel configuration while also enabling the interconnect to route multiple protocols across the electrical layer. Such implementations can provide and define a modular common physical layer that is protocol agnostic and architected to work with potentially any existing or future interconnect protocol.

Figure 6:
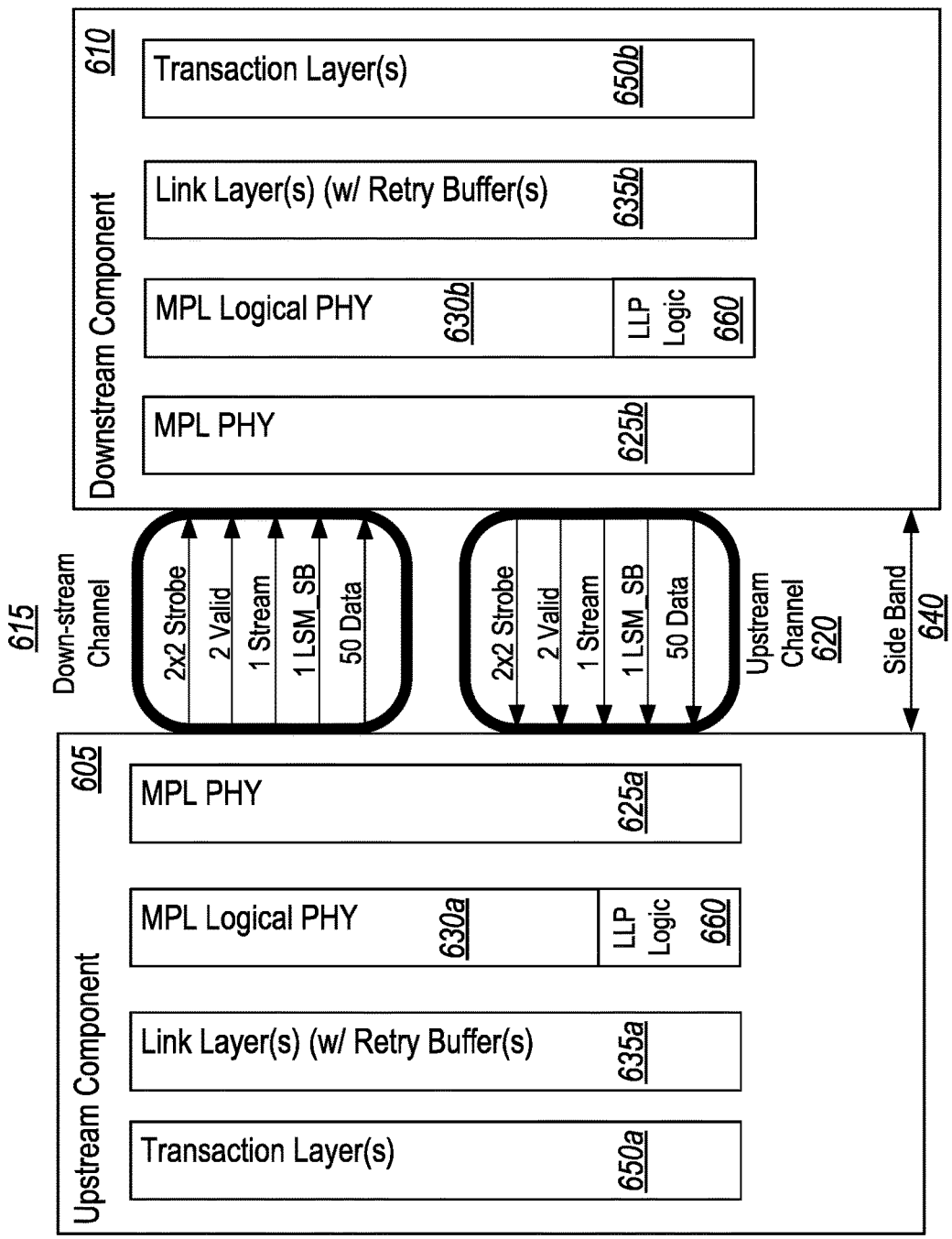
FIG. 6 is a simplified block diagram of an example MPL.

Turning to FIG. 6, a simplified block diagram 600 is shown representing at least a portion of a system including an example implementation of a multi-protocol link (MPL). In one example, an MPL configured to support a more complex connection (e.g., between multi-chip packages) may be implemented using physical electrical connections (e.g., wires implemented as lanes) connecting a first device 605 (e.g., a first die including one or more sub-components) with a second device 610 (e.g., a second die including one or more other sub-components). In the particular example shown in the high-level representation of diagram 600, all signals (in channels 615, 620) can be unidirectional and lanes can be provided for the data signals to have both an upstream and downstream data transfer. While the block diagram 600 of FIG. 6, refers to the first component 605 as the upstream component and the second component 610 as the downstream components, and physical lanes of the MPL used in sending data as a downstream channel 615 and lanes used for receiving data (from component 610) as an upstream channel 620, it should be appreciated that the MPL between devices 605, 610 can be used by each device to both send and receive data between the devices.

In one example implementation, an MPL can provide a physical layer (PHY) including the electrical MPL PHY 625a,b (or, collectively, 625) and executable logic implementing MPL logical PHY 630a,b (or, collectively, 630). Electrical, or physical, PHY 625 can provide the physical connection over which data is communicated between devices 605, 610. Signal conditioning components and logic can be implemented in connection with the physical PHY 625 in order to establish high data rate and channel configuration capabilities of the link, which in some applications can involve tightly clustered physical connections at lengths of approximately 45 mm or more. The logical PHY 630 can include logic for facilitating clocking, link state management (e.g., for link layers 635a, 635b), and protocol multiplexing between potentially multiple, different protocols used for communications over the MPL.

In one example implementation, physical PHY 625 can include, for each channel (e.g., 615, 620) a set of data lanes, over which in-band data can be sent. In this particular example, 50 data lanes are provided in each of the upstream and downstream channels 615, 620, although any other number of lanes can be used as permitted by the layout and power constraints, desired applications, device constraints, etc. Each channel can further include one or more dedicated lanes for a strobe, or clock, signal for the channel, one or more dedicated lanes for a valid signal for the channel, one or more dedicated lanes for a stream signal, and one or more dedicated lanes for a link state machine management or sideband signal. The physical PHY can further include a sideband link 640, which, in some examples, can be a bi-directional lower frequency control signal link used to coordinate state transitions and other attributes of the MPL connecting devices 605, 610, among other examples.

As noted above, multiple protocols can be supported using MPL. Indeed, in some implementations, multiple, independent transaction layers 650a, 650b can be provided at each device 605, 610. For instance, each device 605, 610 may support and utilize two or more protocols, such as PCI, PCIe, QPI, Intel In-Die Interconnect (IDI), Ultra Path Interconnect (UPI), among others. Other protocols can also be supported including Ethernet protocol, Infiniband protocols, and PCIe fabric-based protocols. For IoT and other interconnects involving special purpose, low frequency, or other more simplified systems, the multiple protocols may include one or more protocols such as Universal Asynchronous Receiver/Transmitter (UART), Serial Digital Interface (SDI), I2C, among other potential examples. The combination of the Logical PHY and physical PHY can also be used as a die-to-die interconnect to connect a SerDes PHY (PCIe, Ethernet, Infiniband or other high speed SerDes) on one Die to its upper layers that are implemented on the other die, among other examples.

Logical PHY 630 can support multiplexing between these multiple protocols on an MPL. For instance, the dedicated stream lane can be used to assert an encoded stream signal that identifies which protocol is to apply to data sent substantially concurrently on the data lanes of the channel. Further, logical PHY 630 can be used to negotiate the various types of link state transitions that the various protocols may support or request. In some instances, LSM_SB signals sent over the channel's dedicated LSM_SB lane can be used, together with side band link 640 to communicate and negotiate link state transitions between the devices 605, 610. Further, link training, error detection, skew detection, de-skewing, and other functionality of traditional interconnects can be replaced or governed, in part using logical PHY 630. For instance, valid signals sent over one or more dedicated valid signal lanes in each channel can be used to signal link activity, detect skew, link errors, and realize other features, among other examples. In the particular example of FIG. 6, in implementations of an MPL providing larger numbers of data lanes (e.g., 50 lanes in each direction), multiple valid lanes may be provided per channel. For instance, data lanes within a channel can be bundled or clustered (physically and/or logically) and a valid lane can be provided for each cluster. Further, multiple strobe lanes can be provided, in some cases, also to provide a dedicated strobe signal for each cluster in a plurality of data lane clusters in a channel, among other examples.

As noted above, logical PHY 630 can be used to negotiate and manage link control signals sent between devices connected by the MPL. In some implementations, logical PHY 630 can include link layer packet (LLP) generation logic 660 that can be used to send link layer control messages over the MPL (i.e., in band). Such messages can be sent over data lanes of the channel, with the stream lane identifying that the data is link layer-to-link layer messaging, such as link layer control data, among other examples. Link layer messages enabled using LLP module 660 can assist in the negotiation and performance of link layer state transitioning, power management, loopback, disable, re-centering, scrambling, among other link layer features between the link layers 635a, 635b of devices 605, 610 respectively.

Figure 7:
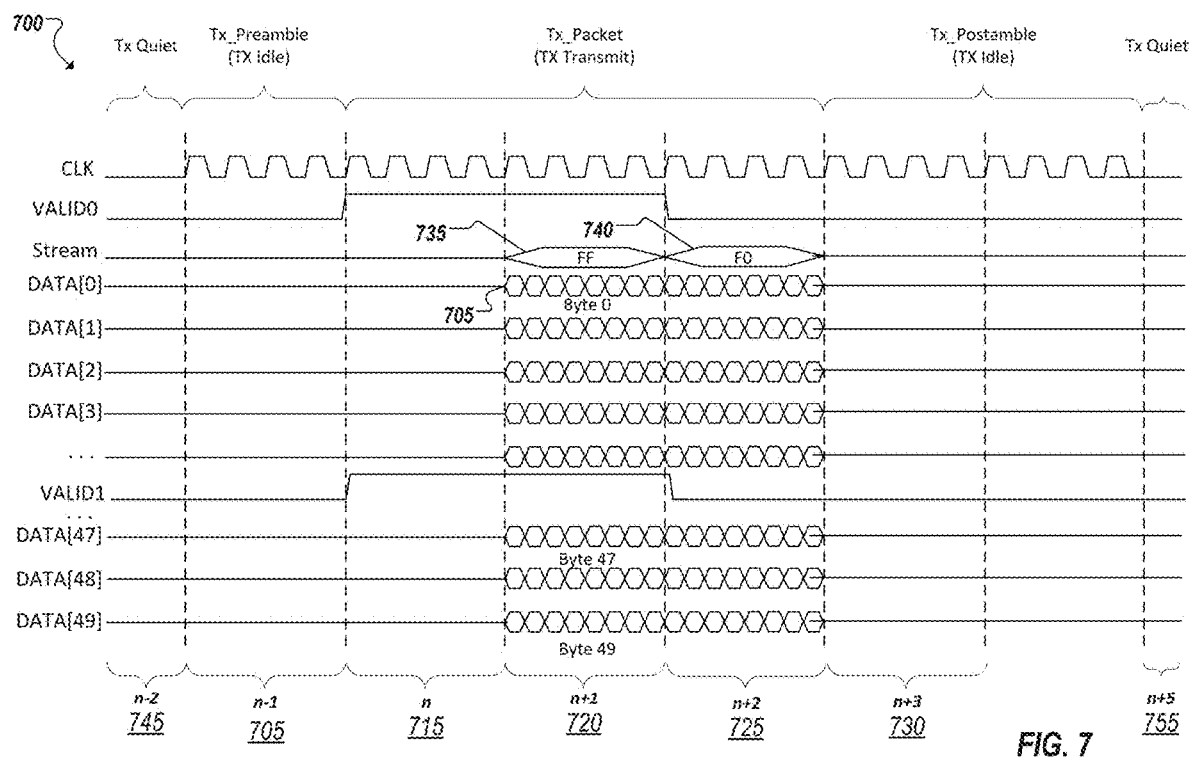
FIG. 7 is a representation of example signaling on an example MPL.

Turning to FIG. 7, a diagram 700 is shown representing example signaling using a set of lanes (e.g., 615, 620) in a particular channel of a first example implementation MPL. The example of FIG. 7 may present an MPL implementation appropriate to a system interconnecting components (e.g., multi-component chips) with larger available pin counts. For instance, in the example of FIG. 7, two clusters of twenty-five (25) data lanes are provided for fifty (50) total data lanes in the channel. A portion of the lanes are shown, while others (e.g., DATA[4-46] and a second strobe signal lane (STRB)) are omitted (e.g., as redundant signals) for convenience in illustrating the particular example. When the physical layer is in an active state (e.g., not powered off or in a low power mode (e.g., an L1 state)), strobe lanes (STRB) can be provided with a synchronous clock signal. In some implementations, data can be sent on both the rising and falling edges of the strobe. Each edge (or half clock cycle) can demarcate a unit interval (UI). Accordingly, in this example, a bit (e.g., 705) can be sent on each lane, allowing for a byte to be sent every 8UI. A byte time period, or byte window, 710 can be defined as 8UI, or the time for sending a byte on a single one of the data lanes (e.g., DATA[0-49]).

In some implementations, a valid signal, sent on one or more dedicated valid signal channels (e.g., VALID0, VALID1), can serve as a leading indicator for the receiving device to identify, when asserted (high), to the receiving device, or sink, that data is being sent from the sending device, or source, on data lanes (e.g., DATA[0-49]) during the following time period, such as a byte time period 710. Alternatively, when the valid signal is low, the source indicates to the sink that the sink will not be sending data on the data lanes during the following time period. Accordingly, when the sink logical PHY detects that the valid signal is not asserted (e.g., on lanes VALID0 and VALID1), the sink can disregard any data that is detected on the data lanes (e.g., DATA[0-49]) during the following time period. For instance, cross talk noise or other bits may appear on one or more of the data lanes when the source, in fact, is not sending any data. By virtue of a low, or non-asserted, valid signal during the previous time period (e.g., the previous byte time period), the sink can determine that the data lanes are to be disregarded during the following time period.

Data sent on each of the lanes of the MPL can be aligned to a strobe or other clock signal. A time period can be defined based on the strobe, such as a byte time period, and each of these periods can correspond to a defined window in which signals are to be sent on the data lanes (e.g., DATA[0-49]), the valid lanes (e.g., VALID1, VALID2), and stream lane (e.g., STREAM). Accordingly, alignment of these signals can enable identification that a valid signal in a previous time period window applies to data in the following time period window, and that a stream signal applies to data in the same time period window. The stream signal can be an encoded signal (e.g., 1 byte of data for a byte time period window), that is encoded to identify the protocol that applies to data being sent during the same time period window.

To illustrate, in the particular example of FIG. 7, a byte time period window is defined. A valid is asserted at a time period window n (715), before any data is injected on data lanes DATA[0-49]. At the following time period window n+1 (720) data is sent on at least some of the data lanes. In this case, data is sent on all fifty data lanes during n+1 (720). Because a valid was asserted for the duration of the preceding time period window n (715), the sink device can validate the data received on data lanes DATA[0-49] during time period window n+1 (720). Additionally, the leading nature of the valid signal during time period window n (715) allows the receiving device to prepare for the incoming data. Continuing with the example of FIG. 7, the valid signal remains asserted (on VALID1 and VALID2) during the duration of time period window n+1 (720), causing the sink device to expect the data sent over data lanes DATA[0-49] during time period window n+2 (725). If the valid signal were to remain asserted during time period window n+2 (725), the sink device could further expect to receive (and process) additional data sent during an immediately subsequent time period window n+3 (730). In the example of FIG. 7, however, the valid signal is de-asserted during the duration of time period window n+2 (725), indicating to the sink device that no data will be sent during time period window n+3 (730) and that any bits detected on data lanes DATA [0-49] should be disregarded during time period window n+3 (730).

As noted above, in some cases, an MPL link may be implemented with multiple valid lanes and strobe lanes per channel. In some systems, this can assist, among other advantages, with maintaining circuit simplicity and synchronization amid the clusters of relatively lengthy physical lanes connecting the two devices. In some implementations, a set of data lanes can be divided into clusters of data lanes. For instance, in the example of FIG. 7, data lanes DATA[0-49] can be divided into two twenty-five lane clusters and each cluster can have a dedicated valid and strobe lane. For instance, valid lane VALID1 can be associated with data lanes DATA[0-24] and valid lane VALID2 can be associated with data lanes DATA[25-49]. The signals on each "copy" of the valid and strobe lanes for each cluster can be identical.

As introduced above, in cases supporting one or more dedicated STREAM lanes, data on stream lane STREAM can be used to indicate to the receiving logical PHY what protocol is to apply to corresponding data being sent on data lanes data lanes DATA[0-49]. In the example of FIG. 7, a stream signal is sent on STREAM during the same time period window as data on data lanes DATA[0-49] to indicate the protocol of the data on the data lanes. In alternative implementations, the stream signal can be sent during a preceding time period window, such as with corresponding valid signals, among other potential modifications. However, continuing with the example of FIG. 7, a stream signal 735 is sent during time period window n+1 (720) that is encoded to indicate the protocol (e.g., PCIe, PCI, IDI, QPI, etc.) that is to apply to the bits sent over data lanes DATA[0-49] during time period window n+1 (720). Similarly, another stream signal 740 can be sent during the subsequent time period window n+2 (725) to indicate the protocol that applies to the bits sent over data lanes DATA [0-49] during time period window n+2 (725), and so on. In some cases, such as the example of FIG. 7 (where both stream signals 735, 740 have the same encoding, binary FF), data in sequential time period windows (e.g., n+1 (720) and n+2 (725)) can belong to the same protocol. However, in other cases, data in sequential time period windows (e.g., n+1 (720) and n+2 (725)) can be from different transactions to which different protocols are to apply, and stream signals (e.g., 735, 740) can be encoded accordingly to identify the different protocols applying to the sequential bytes of data on the data lanes (e.g., DATA[0-49]), among other examples.

In some implementations, a low power or idle state can be defined for the MPL. For instance, when neither device on the MPL is sending data, the physical layer (electrical and logical) of MPL can go to an idle or low power state. For instance, in the example of FIG. 7, at time period window n−2 (745), the MPL is in a quiet or idle state and the strobe is disabled to save power. The MPL can transition out of low-power or idle mode, awaking the strobe at time period window time period window n−1 (e.g., 705). The strobe can complete a transmission preamble (e.g., to assist in waking and synchronizing each of the lanes of the channel, as well as the sink device), beginning the strobe signal prior to any other signaling on the other non-strobe lanes. Following this time period window n−1 (705), the valid signal can be asserted at time period window n (715) to notify the sink that data is forthcoming in the following time period window n+1 (720), as discussed above.

The MPL may re-enter a low power or idle state (e.g., an L1 state) following the detection of idle conditions on the valid lanes, data lanes, and/or other lanes of the MPL channel. For instance, no signaling may be detected beginning at time period window n+3 (730) and going forward. Logic on either the source or sink device can initiate transition back into a low power state leading again (e.g., time period window n+5 (755)) to the strobe going idle in a power savings mode, among other examples and principles (including those discussed later herein).

Electrical characteristics of the physical PHY can include one or more of single-ended signaling, half-rate forwarded clocking, matching of interconnect channel as well as on-chip transport delay of transmitter (source) and receiver (sink), optimized electrostatic discharge (ESD) protection, pad capacitance, among other features. Further, an MPL can be implemented to achieve higher data rate (e.g., approaching 16 Gb/s) and energy efficiency characteristics than traditional package I/O solutions.

While the examples of FIGS. 6 and 7 illustrate an example implementation of a MPL as an interconnect to facilitate a high speed, high bandwidth channel between devices supporting more complex features and having shoreline to support a wide array of pins, including pins for dedicated clock, valid, stream, sideband notification, and data lanes, and even further control lanes such as data bus inversion (DBI) lanes, other implementations may be ill-suited or simply unable to support such MPL configurations. In some implementations, the control functionality of MPL (e.g., provided through the valid, stream, sideband notification, and other signals) may be provided in implementations of MPL which greatly reduce or even forego at least some of the dedicated control lanes provided for in the examples of FIGS. 6 and 7 above. For instance, in some implementations, pulse-amplitude modulation (PAM) may be utilized to encode additional data on one or more of the lanes of the MPL, such as one of the control lanes, the clock (strobe) lane, or even one or more of the data lanes, to implement control signals sent using dedicated lanes in the examples of FIGS. 6 and 7 above.

Figure 8:
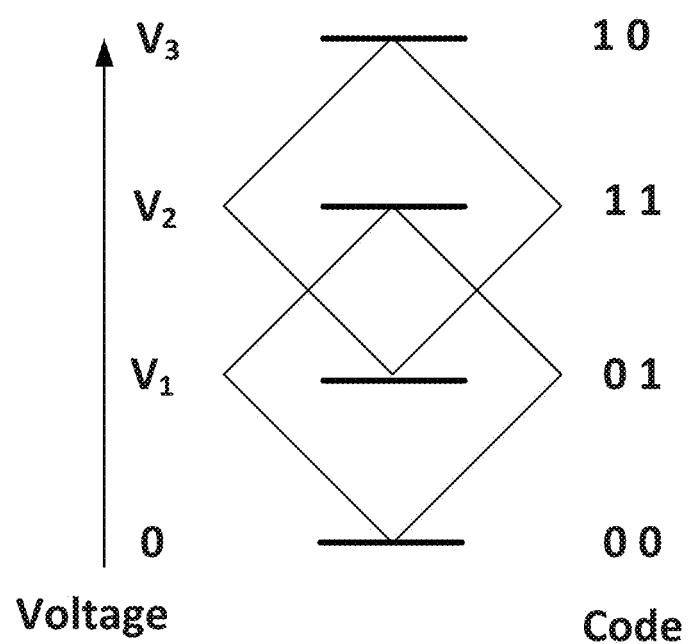
FIG. 8 is a simplified block diagram illustrating voltage amplitude modulation.

For instance, FIG. 8 illustrates a representation 800 showing encoding of data through pulse amplitude modulation. In the particular example of FIG. 8, a PAM-4 modulation scheme is illustrated, through which three non-zero voltage levels (e.g., $V_1$, $V_2$, $V_3$) are defined, beyond the typical binary amplitude found in conventional digital signals. Each of the voltage levels may then be associated with a corresponding data value (represented in this case through one of four 2-bit digital values). For instance, when voltage is zero during a unit interval (or half clock cycle) in which a pulse may be sent, the zero pulse may be interpreted as binary "00". If, instead, a pulse with voltage $V_1$ is received, the pulse may be interpreted as binary "01", voltage $V_2$ may correspond to binary "10", and $V_3$ may correspond to binary "11." Accordingly, in a PAM-4 scheme, over a byte window that includes 8 unit intervals, potentially $4^{\wedge}8$ possible encodings may be sent through a pulse amplitude modulated signal. Other PAM schemes may be used, including PAM-3 modulation (for two possible non-zero pulse amplitudes), among other examples.

Figure 9:
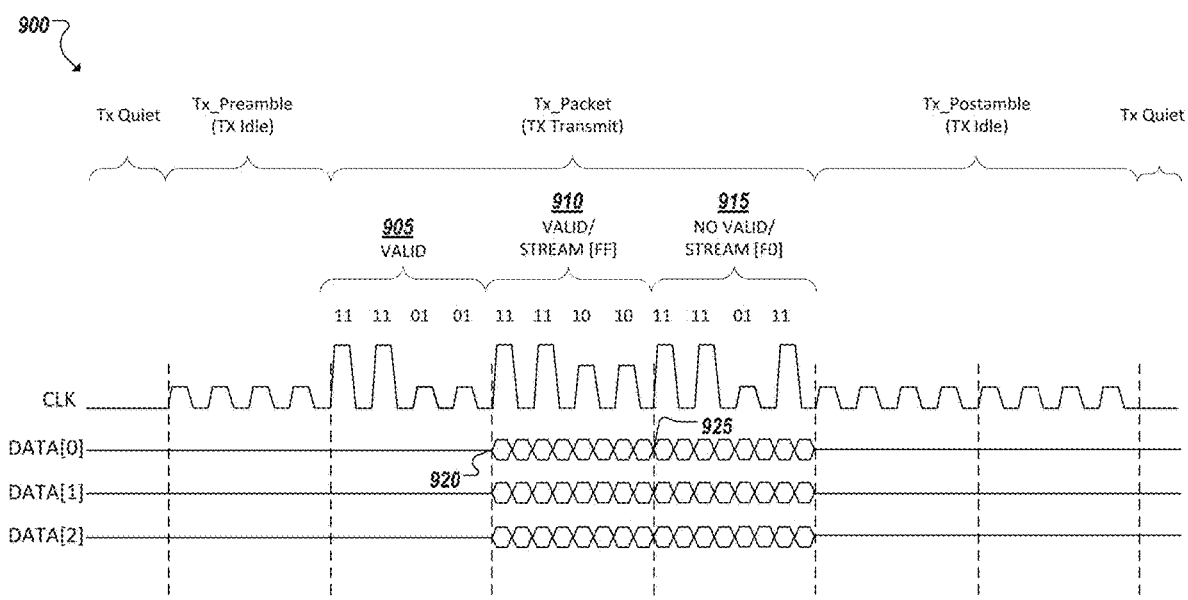
FIG. 9 is a representation of example signaling on an example MPL utilizing voltage amplitude modulation.

Turning to FIG. 9, an example is shown of signaling on another implementation of an MPL. In this example, the signals sent on dedicated lanes STREAM and VALID0 in the example of MPL shown in FIG. 7 are replaced by voltage modulation on the strobe/clock lane CLK. The clock signal, when not encoded with additional control data may resemble a typical binary clock (effectively modulated in a PAM-2 pattern). In this example, PAM-4 modulation is applied to augment the standard PAM-2 clock signal, such that the higher voltage levels (i.e., on top of the standard clock signal) may be utilized to encode control messages on the clock lane. For instance, these control signals encoded on the clock may be used to support the multi-protocol communication functionality of the MPL. Indeed, the example of FIG. 9 corresponds to the example of FIG. 7 as a valid signal is encoded (at 905) on the clock signal to indicate that valid data can be expected on the data lanes (e.g., DATA[0-2]) in a next 8UI byte window. In one example, a receiving component may determine the decode signals received in each 8UI byte window.

In one implementation, UIs encoded to indicate a valid signal may be the first UIs of a byte window. Continuing with the example of FIG. 9, following the valid signal 905, data may be sent in the next byte window on the data lanes and a stream identifier corresponding to the data may be sent in the same byte window (at 910), but encoded on the clock signal. In some instances, a valid (for the next byte window) may also be sent in the same byte window as the stream identifier. For instance, in the example of FIG. 9, PAM may be applied to 8UI of clock signal to encode both a valid signal and stream signal (to indicate a protocol of the data sent in the same byte window) in the same byte window (at 910). For instance, in one example, the first four UI may be used to indicate a valid (or not) and the last four UI of the same window 910 may be used to indicate a stream ID of the data currently being sent in the same byte window 910. In the particular example of FIG. 9, a combined valid/stream ID signal may be encoded on the clock to indicate that data (e.g., 920) of a protocol corresponding to code "FF" is being sent on data lanes DATA[0-2]. In the next window 915, the clock signal may be further encoded through PAM to indicate both a no valid (i.e., that no valid data will be sent in the next byte window) and a stream ID corresponding to another interconnect protocol, indicating that this byte window is being used to send data (e.g., 925) of a different protocol or stream type (e.g., physical layer packet (PLP), PCIe, IDI, UPI, etc.).

It should be appreciated that the encodings shown in the example of FIG. 9 are provided as non-limiting examples only. Indeed, a variety of encodings may be defined, allowing one or more control signals to be overlaid on a clock signal to replace one or more dedicated control lanes and support multi-protocol capabilities of the MPL. Indeed, depending on the number of pins available to facilitate an MPL between components in a device, PAM-based encodings may be defined to replace one or more dedicated control lanes by encoding control signals on a clock lane or on another control lane. Further, the available encodings may also be based on the number of protocols to be supported in communications over an MPL connecting two components. For instance, if only two different protocols are to be sent over the MPL, PAM codes may be limited to codes to identify these two protocols (in stream signals), with more codes being defined for implementations where more than two protocols are to be identified in stream signals. Based on the PAM scheme utilized, and the number of UIs in which a PAM-based code may be sent on a particular lane, an encoding space may be defined. For instance, in an implementation where 4UI of a clock lane may be used to encode control signals (such as in the example of FIG. 9), in a PAM-3 scheme one of $2^4$, or 16, different codes may be selected to be sent on top of the clock signal in a single byte window. In a PAM-4 scheme, however, an encoding space of $3^4$, or 81, different codes may be sent on top of the clock signal in a single byte window. In other cases, such as where each UI of a control lane may be encoded with PAM-based signals, much larger encoding spaces may be available (e.g., $3^8$ (6,561) available codes in a PAM-3 scheme and $4^8$ (65,536) available codes in a PAM-4 scheme), allowing for more detailed and/or varied signaling to be achieved over a single lane (e.g., for a wide variety of stream, DBI, and valid signaling, including codes communicating a combination of stream information, DBI information, valid, and even data on a single lane in the same byte window), among other examples.

Figure 10A:
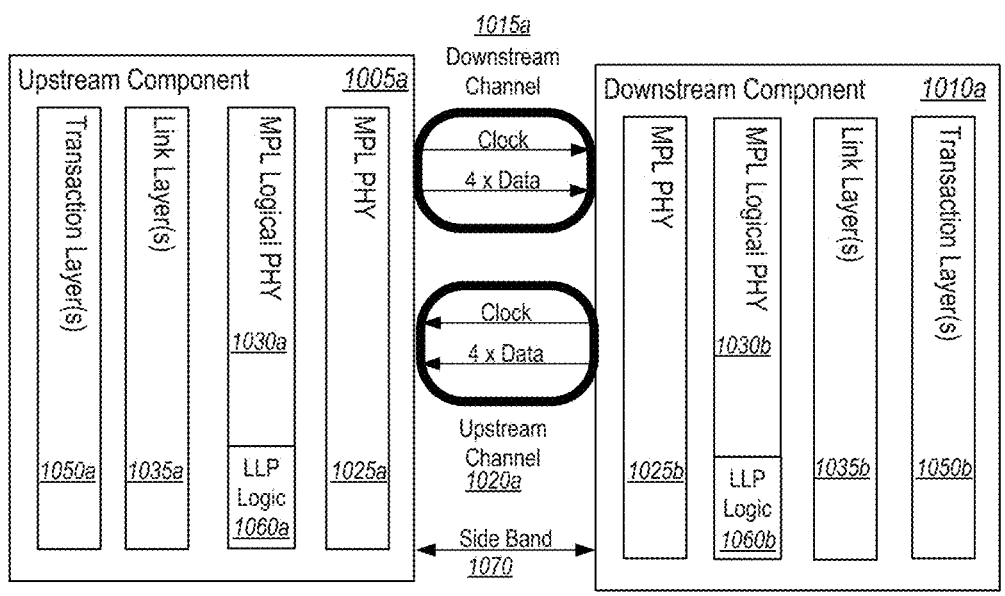
FIGS. 10A-10B are simplified block diagram of systems utilizing an example MPL supporting voltage amplitude modulation.
Figure 10B:
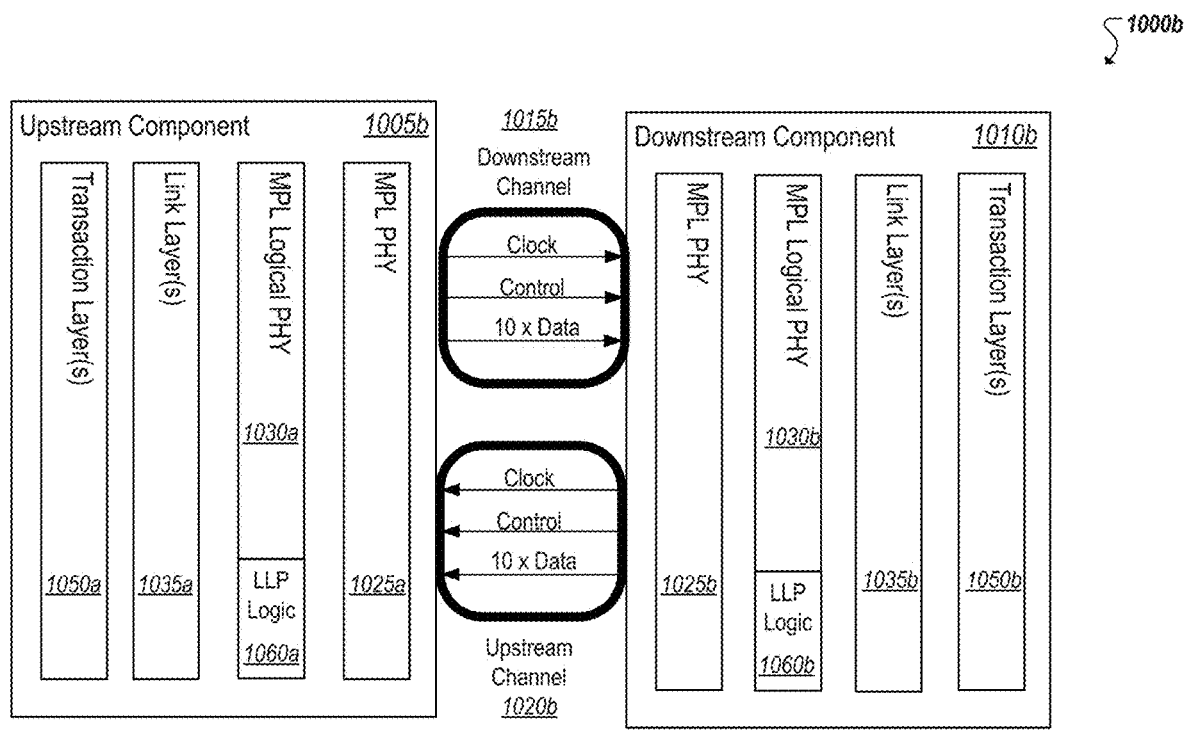

Turning to FIGS. 10A-10B, simplified block diagrams 1000a-b are shown illustrating example systems including a simplified MPL coupling two components that utilizes voltage amplitude modulation to overlay multi-protocol control information on lanes in the MPL. For instance, in the example of FIG. 10A, a system 1000a is shown including an upstream component 1005a and a downstream component 1010a. The upstream and downstream components 1005a, 1010a may be interconnected using an MPL that includes a downstream channel 1015a and an upstream channel 1020a. In contrast to the example MPL illustrated in FIG. 6, in this example, a limited number of physical lanes are provided in each of the downstream and upstream channels. For example, rather than a two valid lanes, 1 stream lane, 1 sideband control lane, and 50 data lanes being provided per channel, in the example of FIG. 10A, a clock lane and four data lanes are provided per channel 1015a, 1020a, but the multiprotocol windowing of data sent on the channel (as in the examples of FIGS. 6 and 7) may be preserved. For instance, the clock lane in each of the downstream and upstream channels 1015a, 1020a, may be utilized to not only send a clock signal corresponding to the link, but PAM encodings may be added on top of the clock signal so as to preserve the clock signal while also communicating additional data, including stream ID information for each window of data (e.g., each byte window) sent over the data lanes of each channel 1015, 1020a, similar to the example illustrated in FIG. 9. Indeed, encodings may be provided to identify each of multiple different protocols which may be adopted in distinct data windows on the MPL. Each component 1005, 1010a may be provided with hardware and/or software based logic to implement a communication stack to facilitate communications using potentially multiple different protocols. For instance, 1005, 1010a may include each MPL PHY logic (e.g., 1025a,b) and MPL logical PHY logic 1030a, 1030b to support the implementation of the MPL and enable the PAM-based encoding and decoding at each component, in addition to the windowing of data sent over the link and signaling (e.g., valid and stream) controlling the multi-protocol support within the defined windows. MPL PHY and logical PHY logic may be based on the same PHY hardware and code used to implement more complex implementations of the MPL, such as shown in FIG. 6, where dedicated control lanes are provided. To support the multiple protocols, link layer (e.g., 1035a,b) and transaction layer logic (e.g., 1050a,b) may also be provided, as well as LLP generation logic 1060a,b, such as also discussed in connection with the example of FIG. 6.

Further, additional control information may also be encoded on the clock to identify a valid (or "pre-valid") indicator, identify a sideband notification (e.g., an LSM sideband indicator), DBI information, among other examples. In the example of FIG. 10A, a sideband channel 1070 may be provided over which state transitions and handshakes and out-of-band control information may be sent. As in the example of FIG. 6, to indicate that data is or will be sent over the sideband channel 1070, a sideband notification signal may be sent in-band and encoded on top of the clock signal on the clock lane of either the downstream or upstream channel (in addition to the encoding provided to enable stream identification), among other example features. In one example, a sideband notification signal may be sent as a pulse spanning an entire byte window in which sideband data is to be sent (over the sideband channel 1070).

Turning to the example of FIG. 10B, another implementation of a simplified MPL is shown. In this example, one or more control lanes may be provided in each of the downstream and upstream channels (e.g., 1015b, 1020b). For instance, a control lane may be provided that is not dedicated to providing multi-protocol support for an MPL. Instead, the control lane may be provided for another purpose, such for DBI signaling. Accordingly, in some implementations, rather than encoding additional MPL control signaling on top of a clock signal, additional control signals may be provided, through amplitude modulation, on top of or in addition to control signals to be sent on a dedicated control lane. Further, multiple dedicated MPL control lanes (e.g., both a valid lane, stream lane, and/or sideband notification lane) may be replaced through a single control lane. Additionally, because the control lane does not carry a clock signal, control data may be encoded in each UI of the signaling window (rather than on only those UIs involving a risking clock edge), among other examples. For instance, as shown in the example of FIG. 10B, some implementations may not make use of, and eliminate a sideband channel (with the control encodings similarly omitting encodings dedicated to identifying signaling on such sideband channels). In yet another example, while FIGS. 10A-10B illustrate dedicated data lanes, in some implementations, data lanes may also be omitted, replaced, or combined with control or clock lanes, such as in cases (e.g., IoT sensors), where low bandwidth data is sent with limited potential values or at relatively infrequent intervals. For instance, a sensor may only communicate one of a limited set of values over an MPL and this data may be likewise encoded, through amplitude modulation (e.g., PAM-4), on a physical lane that is also used to signal control codes relating to multi-protocol support (e.g., stream identification) on that lane, among other examples.

Figure 11A:
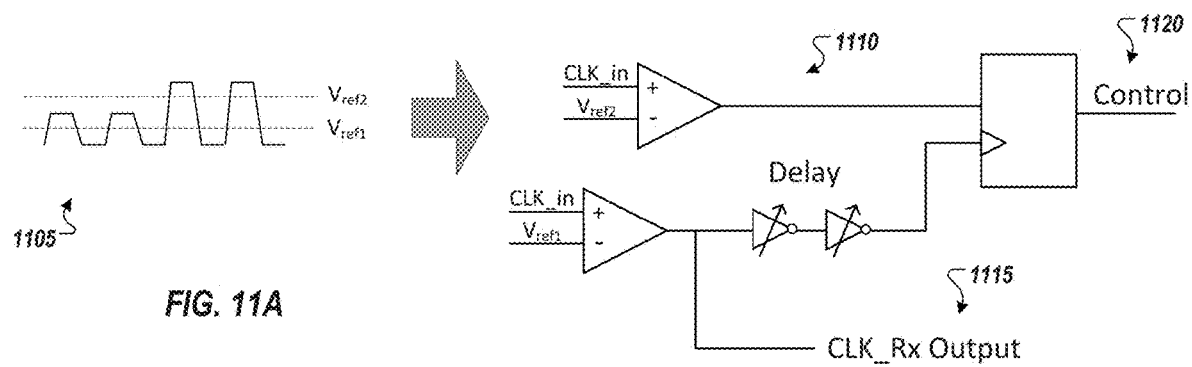
FIGS. 11A-11C are simplified circuit diagrams for processing example clock signals encoded with control signals.
Figure 11B:
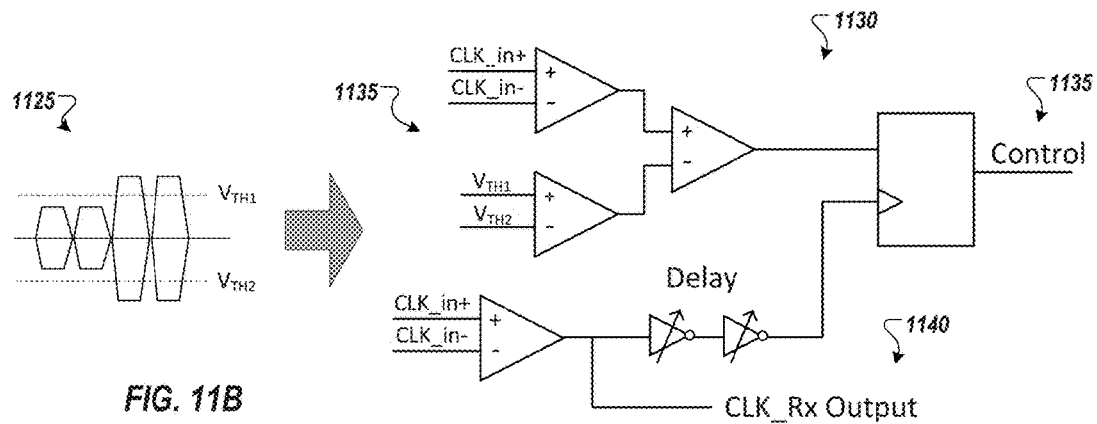
Figure 11C:
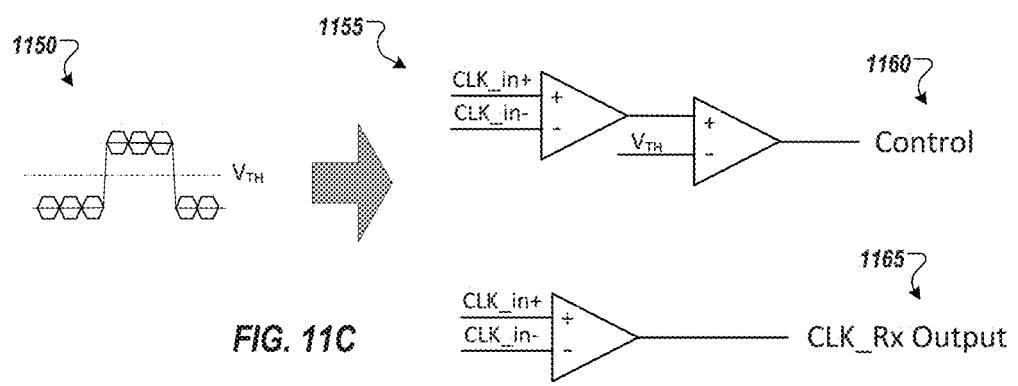

Turning to the examples of FIGS. 11A-11C, as noted above, in some implementations, a control signal used to identify a stream type of data sent or to be sent over an MPL may be encoded on top of a clock signal on a dedicated clock lane of the MPL. FIGS. 11A-11C illustrate various implementations where control information may be encoded with various types of clock signals (e.g., single-ended, differential, etc.). For instance, as illustrated in FIG. 11A, a single-ended 2UI clock signal 1105 may be encoded with additional information through a PAM-based scheme (e.g., PAM-3). The signal 1105 may be provided to a circuit (e.g., 1110) that includes, as inputs, reference voltages (e.g., $V_{ref1}$ and $V_{ref2}$), which may correspond to the voltage levels used in the amplitude modulation encodings (as shown). Comparators may be provided within the circuit to separate the clock signal (e.g., pulses greater than $V_{ref1}$) from the overlaid control data (e.g., pulses greater than $V_{ref2}$) to provide a clock output 1115 and control signal output 1120 to be processed by a receiver of the combined clock (e.g., CLK_in) signal 1105.

Turning to the example of FIG. 11B, a clock signal may be implemented as s differential clock (e.g., 1125). As with a single-ended clock, a differential clock signal may be amplitude modulated (e.g., at 1125) to encode MPL control information on the same lane as the differential clock signal. An example decoding circuit (e.g., 1130, with four-input differential amplifier 1135 (e.g., provided for offset correction)) may be provided to again take the clock signal as an input, and separate control data 1140 from the clock (output at 1145). In some cases, amplitude modulation of a higher speed clock signals may introduce clock duty cycle jitter. Accordingly, in some implementations, jitter may be reduced for a differential clock by encoding MPL control information in the clock signal through common mode modulation, rather than clock swing, such as shown in the example common-mode-modulated differential signal 1150 in FIG. 11C. The example of FIG. 11C further illustrates circuits 1155 through which a control signal 1160 and the differential clock 1165 may be isolated from the modulated clock signal 1150.

Figure 12:
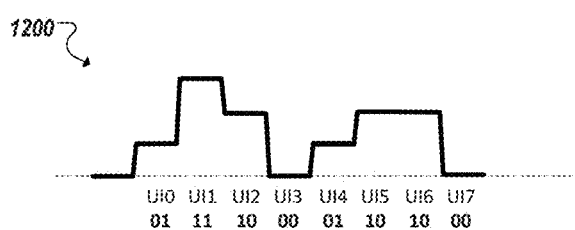
FIG. 12 is a representation of example signaling on an example MPL utilizing voltage amplitude modulation.

As noted above, in some implementations, MPL control lanes may be replaced by encoding MPL control signals (e.g., stream ID signals) on another control lane, rather than a clock lane. For instance, a simple forwarded clock may be used and one or more control lanes already provided for in an implementation (e.g., for data bus inversion) may be extended to carry PAM-based codes. In one example, a lane may be provided for coordinating DBI on an MPL. DBI is a technique that may be used to strategically invert the databus during transmissions in order to reduce the number of lane transitions and thereby reduce power. Accordingly, a DBI value may change from UI to UI and may be advantageously sent on a separate control lane. This DBI lane may be further used for control signal encoding. For instance, as shown in the example of FIG. 12, a control lane may be extended through PAM-based encoding, allowing more information to be sent in a signaling window than on another implementation that may use a clock lane to carry MPL control signals. In some cases, the control lane may be encoded according to an alignment clock, such that an alignment signal or value (e.g., a zero) is sent at a particular frequency. For instance, in the example of FIG. 12, every 4th UI may be a 00 followed by a non-00 value which allows for easy alignment clock recovery. In such an example (using PAM-4 encoding), in each 4 UI window, the first 3 UI are non-00 values allowing for 3^3 (27) codes. In one example, 16 of the 27 possible codes can be used for DBI and the remaining for MPL control information (and perhaps also data). Through such an example, alignment events may be encoded onto the lane to allow symbol boundaries (e.g., an 8UI 'symbol' or window boundary) to be readily recovered. In some implementations, where comparatively few protocol are to be supported, a single UI (or two consecutive UIs, etc.) may be designated for the encoding of stream ID information. For instance, in one example, stream ID may be encoded at UI 3, UI 7, or some other instance. Symbol boundaries may still be encoded and derived into the preceding control codes (e.g., EarlyValid, preamble, postamble), among other example features. Further, various DBI algorithms may be utilized. Indeed, the algorithm could be changed at the transmitter and communicated to the receiver by an additional control code at the start of transfer. Such implementations may be thereby used as an example mechanism to implement a forward subchannel to change physical link settings dynamically, among other examples.

Additional features can also be optionally implemented in some examples of a MPL to enhance the performance characteristics of the physical link. For instance, line coding can be provided. While mid-rail terminations, such as described above, can allow for DC data bus inversion (DBI) to be omitted, AC DBI can still be used to reduce the dynamic power. More complicated coding can also be used to eliminate the worst case difference of 1's and 0's to reduce, for instance, the drive requirement of mid-rail regulator, as well as limit I/O switching noise, among other example benefits. Further, transmitter equalization can also be optionally implemented. For instance, at very high data rates, insertion loss can be a significant for an in-package channel. A two-tap weight transmitter equalization (e.g., performed during an initial power-up sequence) can, in some cases, be sufficient to mitigate some of these issues, among others.

Figure 13:
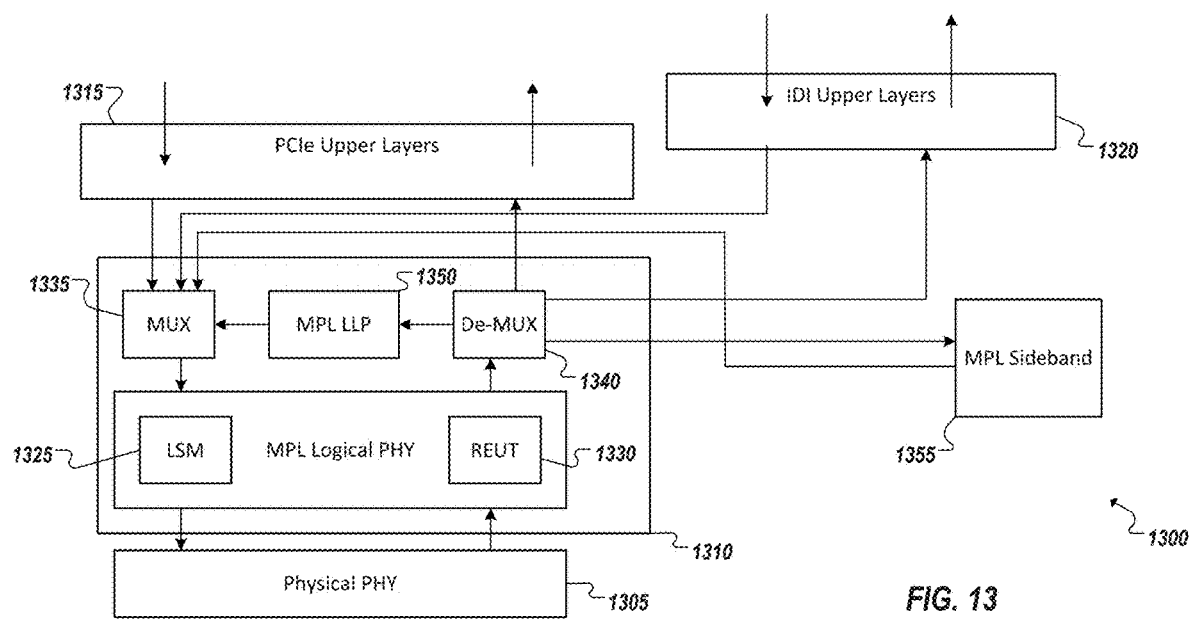
FIG. 13 is a simplified block diagram of an MPL.

Turning to FIG. 13, a simplified block diagram 1300 is shown illustrating an example logical PHY of an example MPL. A physical PHY 1305 can connect to a component that includes logical PHY 1310 and additional logic supporting a link layer of the MPL. The die, in this example, can further include logic to support multiple different protocols on the MPL. For instance, in the example of FIG. 13, PCIe logic 1315 can be provided as well as UPI logic 1320, such that the component can communicate using either PCIe or UPI over the same MPL connecting the two components, among potentially many other examples, including examples where more than two protocols or protocols other than PCIe and UPI are supported over the MPL. Various protocols supported between the components can offer varying levels of service and features.

Logical PHY 1310 can include link state machine management logic 1325 for negotiating link state transitions in connection with requests of upper layer logic of the component (e.g., received over PCIe or UPI). Logical PHY 1310 can further include link testing and debug logic (e.g., 1330) ion some implementations. As noted above, an example MPL can support control signals that are sent between components over the MPL to facilitate protocol agnostic, high performance, and power efficiency features (among other example features) of the MPL. For instance, logical PHY 1310 can support the generation and sending, as well as the receiving and processing of valid signals, stream signals, and LSM sideband signals in connection with the sending and receiving of data over data lanes, such as described in examples above.

In some implementations, multiplexing (e.g., 1335) and demultiplexing (e.g., 1340) logic can be included in, or be otherwise accessible to, logical PHY 1310. For instance, multiplexing logic (e.g., 1335) can be used to identify data (e.g., embodied as packets, messages, etc.) that is to be sent out onto the MPL. The multiplexing logic 1335 can identify the protocol governing the data and generate a stream signal that is encoded to identify the protocol. For instance, in one example implementation, the stream signal can be encoded as a byte of two hexadecimal symbols (e.g., UPI: FFh; PCIe: F0h; LLP: AAh; sideband: 55h; etc.) or simply a binary value and can be sent during the same window (e.g., a byte time period window) of the data governed by the identified protocol. Similarly, demultiplexing logic 1340 can be employed to interpret incoming stream signals to decode the stream signal and identify the protocol that is to apply to data concurrently received with the stream signal on the data lanes. The demultiplexing logic 1340 can then apply (or ensure) protocol-specific link layer handling and cause the data to be handled by the corresponding protocol logic (e.g., PCIe logic 1315 or UPI logic 1320).

Logical PHY 1310 can further include link layer packet logic 1350 that can be used to handle various link control functions, including power management tasks, loopback, disable, re-centering, scrambling, etc. LLP logic 1350 can facilitate link layer-to-link layer messages over MPL, among other functions. Data corresponding to the LLP signaling can be also be identified by a stream signal that is encoded to identify that the data lanes LLP data. Multiplexing and demultiplexing logic (e.g., 1335, 1340) can also be used to generate and interpret the stream signals corresponding to LLP traffic, as well as cause such traffic to be handled by the appropriate component logic (e.g., LLP logic 1350). Likewise, as some implementations of an MCLP can include a dedicated sideband (e.g., sideband 1355 and supporting logic), such as an asynchronous and/or lower frequency sideband channel, among other examples.

Logical PHY logic 1310 can further include link state machine management logic that can generate and receive (and use) link state management messaging over a dedicated link state management (LSM) sideband lane. For instance, an LSM sideband lane can be used to perform handshaking to advance link training state, exit out of power management states (e.g., an L1 state), among other potential examples. The LSM sideband signal can be an asynchronous signal, in that it is not aligned with the data, valid, and stream signals of the link, but instead corresponds to signaling state transitions and align the link state machine between the two component or chips connected by the link, among other examples. Providing a dedicated LSM sideband lane can, in some examples, allow for traditional squelch and received detect circuits of an analog front end (AFE) to be eliminated, among other example benefits. Sideband handshakes can be used to facilitate link state machine transitions between components or chips in a multi-chip package. For instance, signals on the LSM sideband lanes of an MPL can be used to synchronize the state machine transitions across the component. For example, when the conditions to exit a state (e.g., Reset.Idle) are met, the side that met those conditions can assert, on its outbound LSM_SB lane, an LSM sideband signal and wait for the other remote component to reach the same condition and assert an LSM sideband signal on its LSM_SB lane. When both LSM_SB signals are asserted the link state machine of each respective component can transition to the next state (e.g., a Reset.Cal state). A minimum overlap time can be defined during which both LSM_SB signals should be kept asserted prior to transitioning state. Further, a minimum quiesce time can be defined after LSM_SB is de-asserted to allow for accurate turn-around detection. In some implementations, every link state machine transition can be conditioned on and facilitated by such LSM_SB handshakes.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 14:
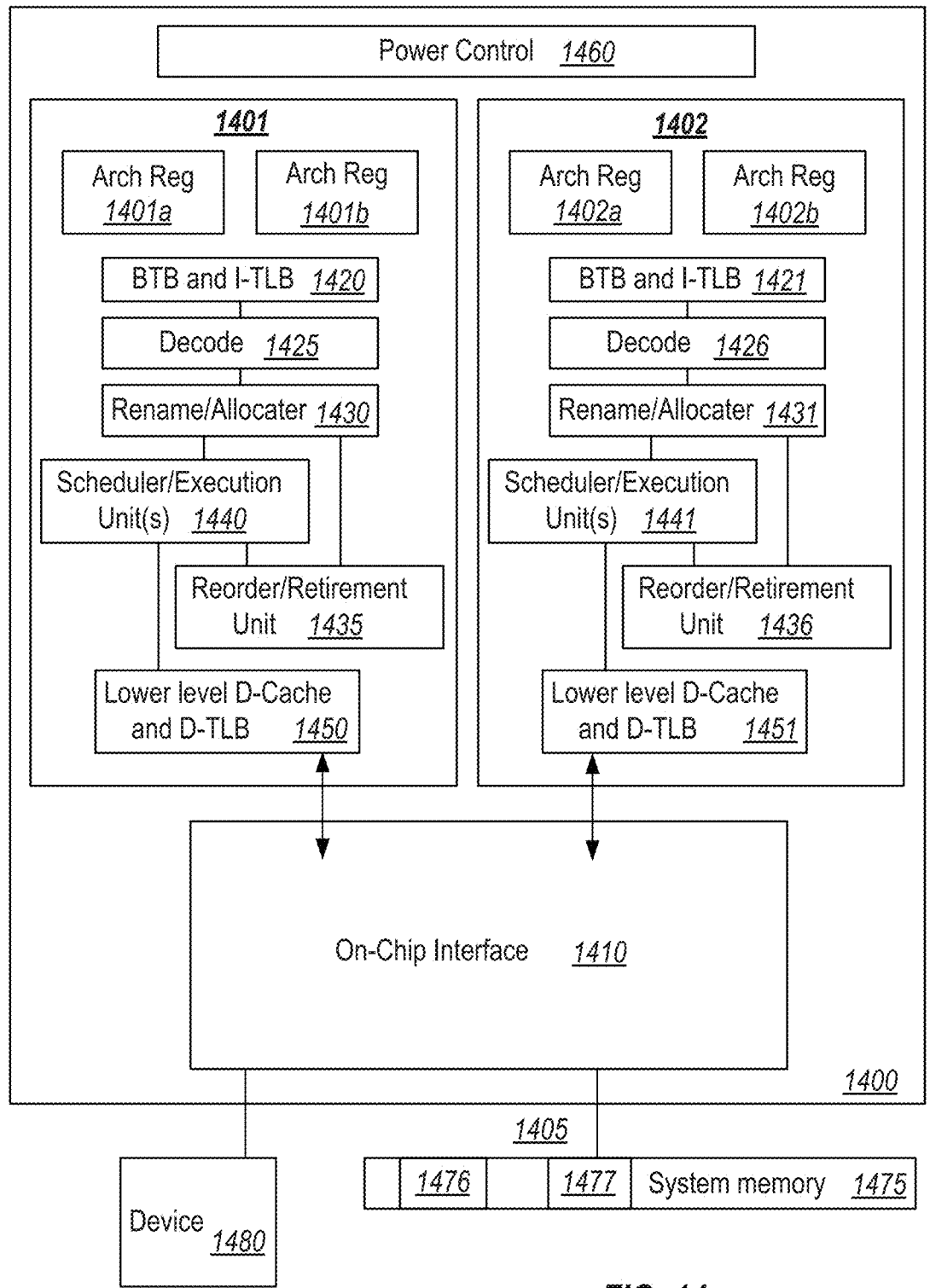
FIG. 14 illustrates an embodiment of a block diagram for a computing system including a multicore processor.

Referring to FIG. 14, an embodiment of a block diagram for a computing system including a multicore processor is depicted. Processor 1400 includes any processor or processing device, such as a microprocessor, an embedded processor, a digital signal processor (DSP), a network processor, a handheld processor, an application processor, a co-processor, a system on a chip (SOC), or other device to execute code. Processor 1400, in one embodiment, includes at least two cores-core 1401 and 1402, which may include asymmetric cores or symmetric cores (the illustrated embodiment). However, processor 1400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1400, as illustrated in FIG. 14, includes two cores-core 1401 and 1402. Here, core 1401 and 1402 are considered symmetric cores, i.e. cores with the same configurations, functional units, and/or logic. In another embodiment, core 1401 includes an out-of-order processor core, while core 1402 includes an in-order processor core. However, cores 1401 and 1402 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1401 are described in further detail below, as the units in core 1402 operate in a similar manner in the depicted embodiment.

As depicted, core 1401 includes two hardware threads 1401*a* and 1401*b*, which may also be referred to as hardware thread slots 1401*a* and 1401*b*. Therefore, software entities, such as an operating system, in one embodiment potentially view processor 1400 as four separate processors, i.e., four logical processors or processing elements capable of executing four software threads concurrently. As alluded to above, a first thread is associated with architecture state registers 1401*a*, a second thread is associated with architecture state registers 1401*b*, a third thread may be associated with architecture state registers 1402*a*, and a fourth thread may be associated with architecture state registers 1402*b*. Here, each of the architecture state registers (1401*a*, 1401*b*, 1402*a*, and 1402*b*) may be referred to as processing elements, thread slots, or thread units, as described above. As illustrated, architecture state registers 1401*a* are replicated in architecture state registers 1401*b*, so individual architecture states/contexts are capable of being stored for logical processor 1401*a* and logical processor 1401*b*. In core 1401, other smaller resources, such as instruction pointers and renaming logic in allocator and renamer block 1430 may also be replicated for threads 1401*a* and 1401*b*. Some resources, such as re-order buffers in reorder/retirement unit 1435, ILTB 1420, load/store buffers, and queues may be shared through partitioning. Other resources, such as general purpose internal registers, page-table base register(s), low-level data-cache and data-TLB 1415, execution unit(s) 1440, and portions of out-of-order unit 1435 are potentially fully shared.

Processor 1400 often includes other resources, which may be fully shared, shared through partitioning, or dedicated by/to processing elements. In FIG. 14, an embodiment of a purely exemplary processor with illustrative logical units/resources of a processor is illustrated. Note that a processor may include, or omit, any of these functional units, as well as include any other known functional units, logic, or firmware not depicted. As illustrated, core 1401 includes a simplified, representative out-of-order (OOO) processor core. But an in-order processor may be utilized in different embodiments. The OOO core includes a branch target buffer 1420 to predict branches to be executed/taken and an instruction-translation buffer (I-TLB) 1420 to store address translation entries for instructions.

Core 1401 further includes decode module 1425 coupled to fetch unit 1420 to decode fetched elements. Fetch logic, in one embodiment, includes individual sequencers associated with thread slots 1401*a*, 1401*b*, respectively. Usually core 1401 is associated with a first ISA, which defines/specifies instructions executable on processor 1400. Often machine code instructions that are part of the first ISA include a portion of the instruction (referred to as an opcode), which references/specifies an instruction or operation to be performed. Decode logic 1425 includes circuitry that recognizes these instructions from their opcodes and passes the decoded instructions on in the pipeline for processing as defined by the first ISA. For example, as discussed in more detail below decoders 1425, in one embodiment, include logic designed or adapted to recognize specific instructions, such as transactional instruction. As a result of the recognition by decoders 1425, the architecture or core 1401 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1426, in one embodiment, recognize the same ISA (or a subset thereof). Alternatively, in a heterogeneous core environment, decoders 1426 recognize a second ISA (either a subset of the first ISA or a distinct ISA).

In one example, allocator and renamer block 1430 includes an allocator to reserve resources, such as register files to store instruction processing results. However, threads 1401*a* and 1401*b* are potentially capable of out-of-order execution, where allocator and renamer block 1430 also reserves other resources, such as reorder buffers to track instruction results. Unit 1430 may also include a register renamer to rename program/instruction reference registers to other registers internal to processor 1400. Reorder/retirement unit 1435 includes components, such as the reorder buffers mentioned above, load buffers, and store buffers, to support out-of-order execution and later in-order retirement of instructions executed out-of-order.

Scheduler and execution unit(s) block 1440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1450 are coupled to execution unit(s) 1440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1401 and 1402 share access to higher-level or further-out cache, such as a second level cache associated with on-chip interface 1410. Note that higher-level or further-out refers to cache levels increasing or getting further way from the execution unit(s). In one embodiment, higher-level cache is a last-level data cache—last cache in the memory hierarchy on processor 1400—such as a second or third level data cache. However, higher level cache is not so limited, as it may be associated with or include an instruction cache. A trace cache—a type of instruction cache—instead may be coupled after decoder 1425 to store recently decoded traces. Here, an instruction potentially refers to a macro-instruction (i.e. a general instruction recognized by the decoders), which may decode into a number of micro-instructions (micro-operations).

In the depicted configuration, processor 1400 also includes on-chip interface module 1410. Historically, a memory controller, which is described in more detail below, has been included in a computing system external to processor 1400. In this scenario, on-chip interface 1410 is to communicate with devices external to processor 1400, such as system memory 1475, a chipset (often including a memory controller hub to connect to memory 1475 and an I/O controller hub to connect peripheral devices), a memory controller hub, a northbridge, or other integrated circuit. And in this scenario, bus 1405 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1475 may be dedicated to processor 1400 or shared with other devices in a system. Common examples of types of memory 1475 include DRAM, SRAM, non-volatile memory (NV memory), and other known storage devices. Note that device 1480 may include a graphic accelerator, processor or card coupled to a memory controller hub, data storage coupled to an I/O controller hub, a wireless transceiver, a flash device, an audio controller, a network controller, or other known device.

Recently however, as more logic, components, and devices are being integrated on a single die, such as SOC, each of these devices may be incorporated on processor 1400. For example in one embodiment, a memory controller hub is on the same package and/or die with processor 1400. Here, a portion of the core (an on-core portion) 1410 includes one or more controller(s) for interfacing with other devices such as memory 1475 or a graphics device 1480. The configuration including an interconnect and controllers for interfacing with such devices is often referred to as an on-core (or un-core configuration). As an example, on-chip interface 1410 includes a ring interconnect for on-chip communication and a high-speed serial point-to-point link 1405 for off-chip communication. Yet, in the SOC environment, even more devices, such as the network interface, co-processors, memory 1475, graphics processor 1480, and any other known computer devices/interface may be integrated on a single die or integrated circuit to provide small form factor with high functionality and low power consumption.

In one embodiment, processor 1400 is capable of executing a compiler, optimization, and/or translator code 1477 to compile, translate, and/or optimize application code 1476 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 15:
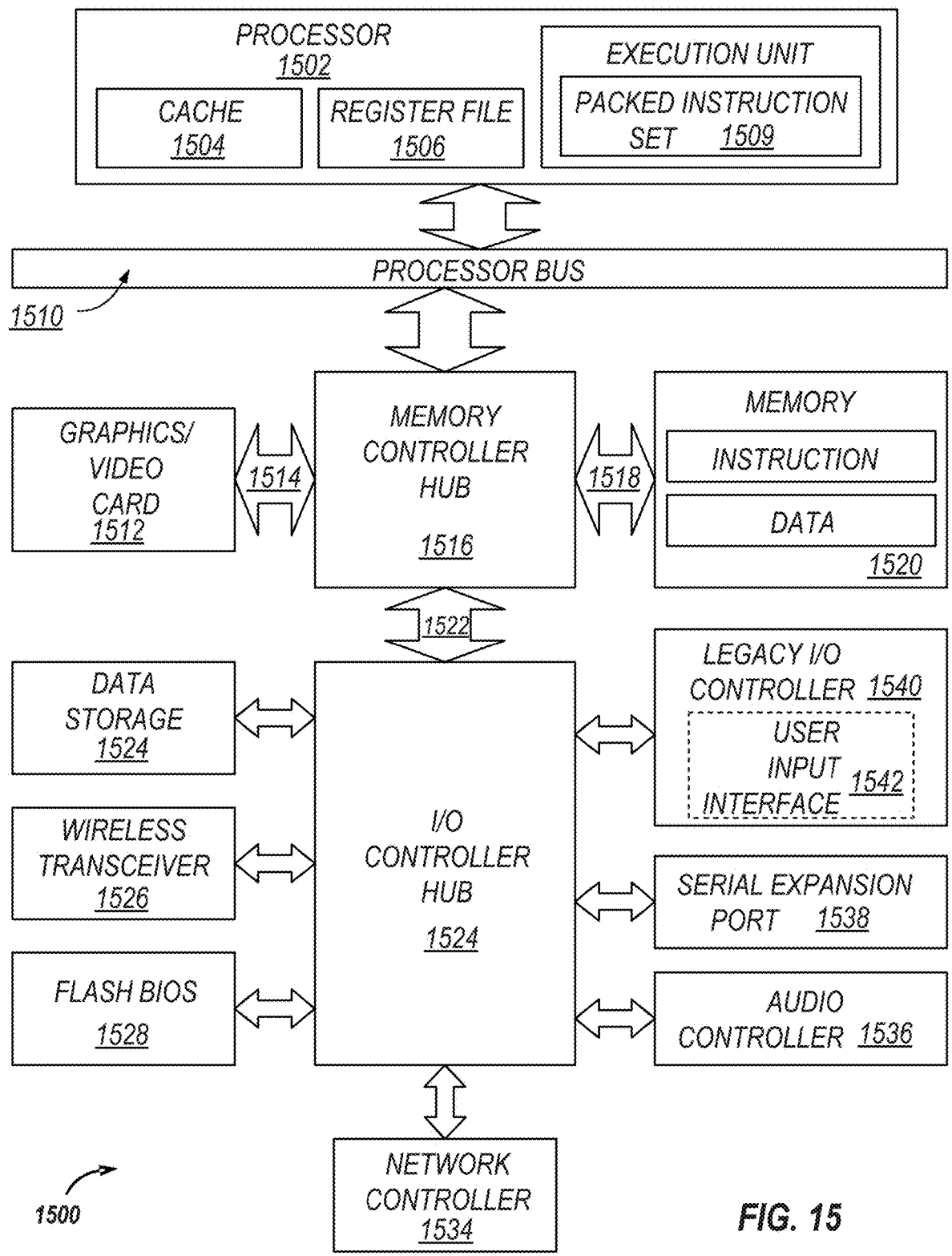
FIG. 15 illustrates another embodiment of a block diagram for a computing system including a processor.

Turning to FIG. 15, a block diagram of an exemplary computer system formed with a processor that includes execution units to execute an instruction, where one or more of the interconnects implement one or more features in accordance with one embodiment of the present invention is illustrated. System 1500 includes a component, such as a processor 1502 to employ execution units including logic to perform algorithms for process data, in accordance with the present invention, such as in the embodiment described herein. System 1500 is representative of processing systems based on the PENTIUM III™, PENTIUM 4™, Xeon™, Itanium, XScale™ and/or StrongARM™ microprocessors, although other systems (including PCs having other microprocessors, engineering workstations, set-top boxes and the like) may also be used. In one embodiment, sample system 1500 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1502 includes one or more execution units 1508 to implement an algorithm that is to perform at least one instruction. One embodiment may be described in the context of a single processor desktop or server system, but alternative embodiments may be included in a multiprocessor system. System 1500 is an example of a 'hub' system architecture. The computer system 1500 includes a processor 1502 to process data signals. The processor 1502, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1502 is coupled to a processor bus 1510 that transmits data signals between the processor 1502 and other components in the system 1500. The elements of system 1500 (e.g. graphics accelerator 1512, memory controller hub 1516, memory 1520, I/O controller hub 1524, wireless transceiver 1526, Flash BIOS 1528, Network controller 1534, Audio controller 1536, Serial expansion port 1538, I/O controller 1540, etc.) perform their conventional functions that are well known to those familiar with the art.

In one embodiment, the processor 1502 includes a Level 1 (L1) internal cache memory 1504. Depending on the architecture, the processor 1502 may have a single internal cache or multiple levels of internal caches. Other embodiments include a combination of both internal and external caches depending on the particular implementation and needs. Register file 1506 is to store different types of data in various registers including integer registers, floating point registers, vector registers, banked registers, shadow registers, checkpoint registers, status registers, and instruction pointer register.

Execution unit 1508, including logic to perform integer and floating point operations, also resides in the processor 1502. The processor 1502, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1502. For one embodiment, execution unit 1508 includes logic to handle a packed instruction set 1509. By including the packed instruction set 1509 in the instruction set of a general-purpose processor 1502, along with associated circuitry to execute the instructions, the operations used by many multimedia applications may be performed using packed data in a general-purpose processor 1502. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1508 may also be used in micro controllers, embedded processors, graphics devices, DSPs, and other types of logic circuits. System 1500 includes a memory 1520. Memory 1520 includes a dynamic random access memory (DRAM) device, a static random access memory (SRAM) device, flash memory device, or other memory device. Memory 1520 stores instructions and/or data represented by data signals that are to be executed by the processor 1502.

Note that any of the aforementioned features or aspects of the invention may be utilized on one or more interconnect illustrated in FIG. 15. For example, an on-die interconnect (ODI), which is not shown, for coupling internal units of processor 1502 implements one or more aspects of the invention described above. Or the invention is associated with a processor bus 1510 (e.g. other known high performance computing interconnect), a high bandwidth memory path 1518 to memory 1520, a point-to-point link to graphics accelerator 1512 (e.g. a Peripheral Component Interconnect express (PCIe) compliant fabric), a controller hub interconnect 1522, an I/O or other interconnect (e.g. USB, PCI, PCIe) for coupling the other illustrated components. Some examples of such components include the audio controller 1536, firmware hub (flash BIOS) 1528, wireless transceiver 1526, data storage 1524, legacy I/O controller 1510 containing user input and keyboard interfaces 1542, a serial expansion port 1538 such as Universal Serial Bus (USB), and a network controller 1534. The data storage device 1524 can comprise a hard disk drive, a floppy disk drive, a CD-ROM device, a flash memory device, or other mass storage device.

Figure 16:
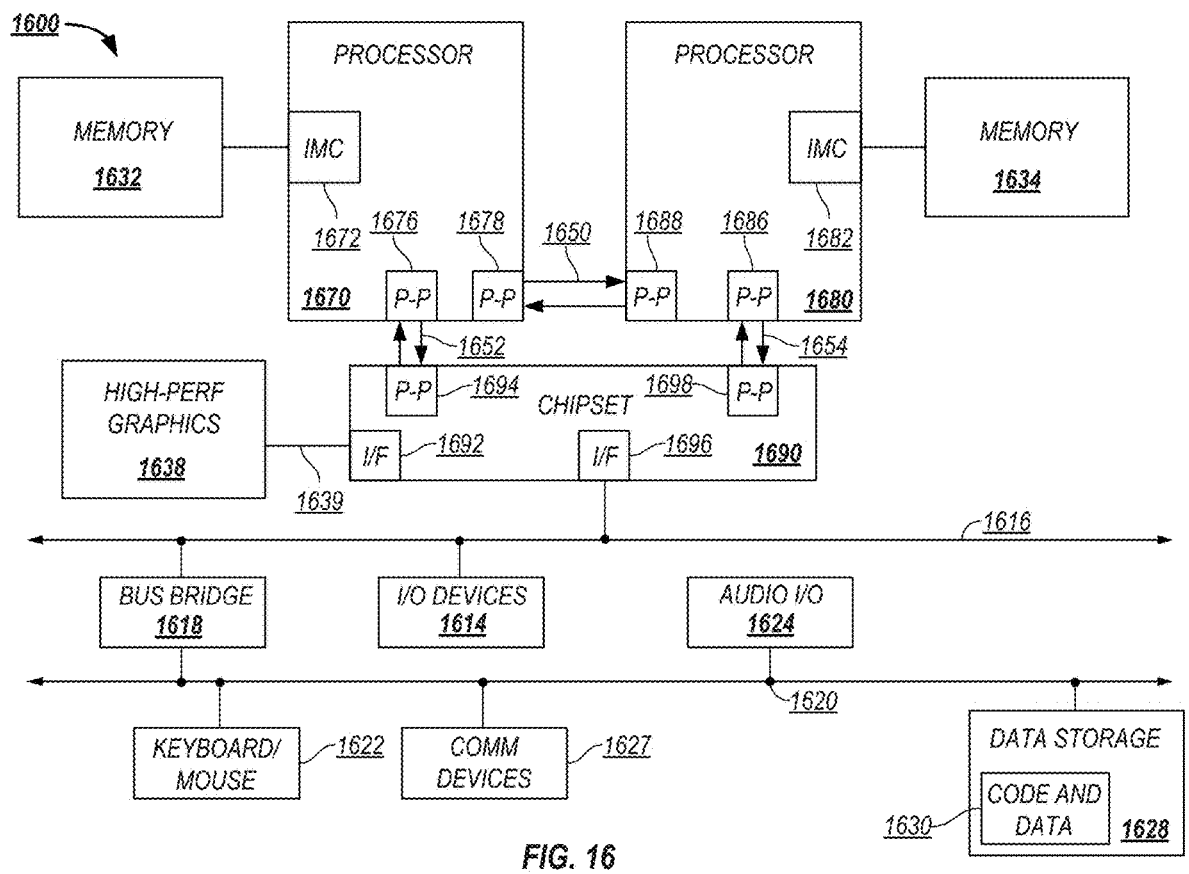
FIG. 16 illustrates an embodiment of a block for a computing system including multiple processors.

Referring now to FIG. 16, shown is a block diagram of a second system 1600 in accordance with an embodiment of the present invention. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of a processor. In one embodiment, 1652 and 1654 are part of a serial, point-to-point coherent interconnect fabric, such as a high-performance architecture. As a result, the invention may be implemented within the QPI architecture.

While shown with only two processors 1670, 1680, it is to be understood that the scope of the present invention is not so limited. In other embodiments, one or more additional processors may be present in a given processor.

Processors 1670 and 1680 are shown including integrated memory controller units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 each exchange information with a chipset 1690 via individual P-P interfaces 1652, 1654 using point to point interface circuits 1676, 1694, 1686, 1698. Chipset 1690 also exchanges information with a high-performance graphics circuit 1638 via an interface circuit 1692 along a high-performance graphics interconnect 1639.

A shared cache (not shown) may be included in either processor or outside of both processors; yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present invention is not so limited.

As shown in FIG. 16, various I/O devices 1614 are coupled to first bus 1616, along with a bus bridge 1618 which couples first bus 1616 to a second bus 1620. In one embodiment, second bus 1620 includes a low pin count (LPC) bus. Various devices are coupled to second bus 1620 including, for example, a keyboard and/or mouse 1622, communication devices 1627 and a storage unit 1628 such as a disk drive or other mass storage device which often includes instructions/code and data 1630, in one embodiment. Further, an audio I/O 1624 is shown coupled to second bus 1620. Note that other architectures are possible, where the included components and interconnect architectures vary. For example, instead of the point-to-point architecture of FIG. 16, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is an apparatus including physical layer logic to: receive data on a physical link including a plurality of lanes, where the data is received from a particular component on one or more data lanes of the physical link, and receive a stream signal on a particular one of the plurality of lanes of the physical link, where the stream signal is to identify a type of the data on the one or more data lanes, the type is one of a plurality of different types supported by the particular component, and the stream signal is encoded through voltage amplitude modulation on the particular lane.

Example 2 may include the subject matter of example 1, where the physical layer logic is further to send a link state machine management signal over a sideband link in association with a link state transition, and encode a sideband notification signal on the particular lane through voltage amplitude modulation, where the sideband notification signal indicates the sending of the link state machine management signal over the sideband link.

Example 3 may include the subject matter of any one of examples 1-2, where the type includes a protocol associated with the data, and the protocol is a particular one of a plurality of protocols supported by the particular component.

Example 4 may include the subject matter of example 3, where the physical layer logic is further to decode the stream signal to identify which of the plurality of different protocols applies to the data.

Example 5 may include the subject matter of example 4, where the physical layer logic is further to pass the data to upper layer protocol logic corresponding to the particular one of the plurality of protocols identified in the stream signal, and the apparatus further includes upper layer logic of each of the plurality of protocols.

Example 6 may include the subject matter of example 5, where the physical layer logic is further to receive a valid signal on the particular lane of the physical link, where the valid signal is to identify that valid data is to follow assertion of the valid signal on the one or more data lanes.

Example 7 may include the subject matter of example 6, where the physical layer logic is further to define a series of data windows in which data is to be sent on the data lanes, the valid signal is sent in a particular one of the series of data windows.

Example 8 may include the subject matter of example 7, where the valid signal is to be asserted in a window immediately preceding the window in which the data is to be sent.

Example 9 may include the subject matter of example 8, where data is to be ignored on data lanes in a window immediately following a preceding window in which the valid signal is not asserted.

Example 10 may include the subject matter of any one of examples 7-9, where the valid signal is to be encoded on the particular lane through voltage amplitude modulation.

Example 11 may include the subject matter of any one of examples 6-10, where the stream signal is sent in a same one of the series of data windows as the data.

Example 12 may include the subject matter of any one of examples 1-11, where the particular lane includes a clock lane, and the steam signal is encoded on top of a clock signal sent on the clock lane.

Example 13 may include the subject matter of example 12, where the clock includes a single-ended clock.

Example 14 may include the subject matter of example 12, where the clock includes a differential clock.

Example 15 may include the subject matter of example 14, where the voltage amplitude modulation includes modulation of a common mode voltage of the differential clock.

Example 16 may include the subject matter of any one of examples 1-15, where the particular lane includes a control lane and the stream signal and at least one other control signal are to be sent on the control lane.

Example 17 may include the subject matter of example 16, where the control lane includes a lane for data bus inversion (DBI).

Example 18 may include the subject matter of any one of examples 1-17, where the voltage amplitude modulation includes pulse amplitude modulation.

Example 19 is an apparatus including a first transaction layer logic to generate first data according to a first one of a plurality of communication protocols, a second transaction layer logic to generate second data according to a different, second one of the plurality of communication protocols, and physical layer logic. The physical layer logic can send the first data on one or more data lanes of a physical link including a plurality of lanes, encode a first stream signal on a particular one of the plurality of lanes to indicate that the first data is of the first communication protocol, where the first stream signal is encoded through voltage amplitude modulation on the particular lane, send the second data on one or more data lanes of the physical lane, and encode a second stream signal on the particular lane to indicate that the first data is of the first communication protocol, where the first stream signal is encoded through voltage amplitude modulation on the particular lane.

Example 20 may include the subject matter of example 19, where the first data and the first stream signal are sent during a first signaling window and the second data and the second stream signal are sent during a second signaling window.

Example 21 may include the subject matter of example 20, where other information is also sent on the particular lane with the first stream signal during the first signaling window.

Example 22 may include the subject matter of example 21, where the other information includes a clock signal and the particular lane includes a clock lane.

Example 23 may include the subject matter of example 21, where the other information includes a valid signal to indicate that valid data is to be sent in the second signaling window, and the valid signal corresponds to the second data.

Example 24 is a system including a first component and a second component, connected to the first component by a multi-protocol link, where each of the first and second components support data communications in any one of a plurality of communication protocols, and the second component includes physical layer logic to send data on the multi-protocol link to the first component, where multi-protocol link includes a plurality of lanes and the data is sent on one or more data lanes of the multi-protocol link, and send a stream signal on a particular one of the plurality of lanes of the physical link, where the stream signal is to identify that a particular one of the plurality of communication protocols applies to the data and the stream signal is encoded through voltage amplitude modulation on the particular lane.

Example 25 may include the subject matter of example 24, where the particular lane includes a clock lane and the stream signal is encoded on top of a clock signal sent on the clock lane.

Example 26 may include the subject matter of any one of examples 24-25, where the stream signal is sent concurrent with the data.

Example 27 may include the subject matter of any one of examples 24-26, where the data includes first data, the stream signal includes a first stream signal, and the physical layer logic is further to: send second data on the multi-protocol link to the first component on one or more of the data lanes of the multi-protocol link, and send a second stream signal on a particular one of the plurality of lanes of the physical link, where the second stream signal is to identify that a second one of the plurality of communication protocols applies to the second data and the second stream signal is encoded through voltage amplitude modulation on the particular lane Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   physical layer logic to:
   receive data on a physical link comprising a plurality of lanes, wherein the data is received from a particular component on one or more data lanes of the physical link, and the plurality of lanes further comprises a clock lane to carry a clock signal; and
   receive a stream signal encoded on top of the clock signal on the clock lane of the physical link, wherein the stream signal is to identify a type of the data on the one or more data lanes, the type is one of a plurality of different types supported by the particular component, and the stream signal is encoded through voltage amplitude modulation on the clock lane.

2. The apparatus of claim 1, wherein the physical layer logic is further to:
   send a link state machine management signal over a sideband link in association with a link state transition; and
   encode a sideband notification signal on the particular lane through voltage amplitude modulation, wherein the sideband notification signal indicates the sending of the link state machine management signal over the sideband link.

3. The apparatus of claim 1, wherein the type comprises a protocol associated with the data, and the protocol is a particular one of a plurality of different protocols supported by the particular component.

4. The apparatus of claim 3, wherein the physical layer logic is further to decode the stream signal to identify which of the plurality of different protocols applies to the data.

5. The apparatus of claim 4, wherein the physical layer logic is further to pass the data to upper layer protocol logic corresponding to the particular one of the plurality of different protocols identified in the stream signal, and the apparatus further comprises upper layer logic of each of the plurality of different protocols.

6. The apparatus of claim 1, wherein the physical layer logic is further to receive a valid signal on the particular lane of the physical link, wherein the valid signal is to identify that valid data is to follow assertion of the valid signal on the one or more data lanes.

7. The apparatus of claim 6, wherein the physical layer logic is further to define a series of data windows in which data is to be sent on the data lanes, the valid signal is sent in a particular one of the series of data windows.

8. The apparatus of claim 7, wherein the valid signal is to be asserted in a window immediately preceding the window in which the data is to be sent.

9. The apparatus of claim 8, wherein data is to be ignored on data lanes in a window immediately following a preceding window in which the valid signal is not asserted.

10. The apparatus of claim 7, wherein the valid signal is to be encoded on the particular lane through voltage amplitude modulation.

11. The apparatus of claim 6, wherein the stream signal is sent in a same one of the series of data windows as the data.

12. The apparatus of claim 1, wherein the particular lane comprises a control lane and the stream signal and at least one other control signal are to be sent on the control lane.

13. An apparatus comprising:
   first transaction layer logic to generate first data according to a first one of a plurality of communication protocols;
   second transaction layer logic to generate second data according to a different, second one of the plurality of communication protocols; and
   physical layer logic to:
   send the first data on one or more data lanes of a physical link comprising a plurality of lanes, and the plurality of lanes comprises the data lanes and a clock lane to carry a clock signal;
   encode a first stream signal on top of the clock signal on the clock lane to indicate that the first data is of the first communication protocol, wherein the first stream signal is encoded through voltage amplitude modulation on the clock lane;
   send the second data on one or more data lanes of the physical link; and
   encode a second stream signal on top of the clock signal on the clock lane to indicate that the second data is of the second communication protocol, wherein the second stream signal is encoded through voltage amplitude modulation on the clock lane.

14. The apparatus of claim 13, wherein the first data and the first stream signal are sent during a first signaling window and the second data and the second stream signal are sent during a second signaling window.

15. A system comprising:
a first component; and
a second component, connected to the first component by a multi-protocol link, wherein each of the first and second components support data communications in any one of a plurality of communication protocols, and the second component comprises physical layer logic to:
  send data on the multi-protocol link to the first component, wherein multi-protocol link comprises a plurality of lanes, the data is sent on one or more data lanes in the plurality of lanes of the multi-protocol link, and the plurality of lanes further comprises a clock lane to carry a clock signal; and
  send a stream signal encoded on top of the clock signal on the clock lane of the multi-protocol link, wherein the stream signal is to identify that a particular one of the plurality of communication protocols applies to the data, and the stream signal is encoded through voltage amplitude modulation on the clock lane, and other information is also sent on the particular lane with the stream signal.

16. The system of claim 15, wherein the stream signal is sent concurrent with the data.

* * * * *